US009997095B2

(12) United States Patent
Kim

(10) Patent No.: US 9,997,095 B2
(45) Date of Patent: Jun. 12, 2018

(54) DISPLAY DRIVING CIRCUIT AND DISPLAY APPARATUS INCLUDING THE SAME

(71) Applicant: Samsung Electronics Co., Ltd., Suwon-si, Gyeonggi-do (KR)

(72) Inventor: Jee-hwal Kim, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days. days.

(21) Appl. No.: 15/217,953

(22) Filed: Jul. 22, 2016

(65) Prior Publication Data

US 2017/0061928 A1 Mar. 2, 2017

(30) Foreign Application Priority Data

Aug. 26, 2015 (KR) ........................ 10-2015-0120544

(51) Int. Cl.

| | |
|---|---|
| ***G06F 3/038*** | (2013.01) |
| ***G09G 5/00*** | (2006.01) |
| ***G09G 3/20*** | (2006.01) |
| ***G09G 3/3275*** | (2016.01) |
| ***G09G 3/36*** | (2006.01) |
| ***G09G 5/02*** | (2006.01) |

(52) U.S. Cl.

CPC ............. *G09G 3/20* (2013.01); *G09G 3/2003* (2013.01); *G09G 3/3275* (2013.01); *G09G 3/3685* (2013.01); *G09G 5/026* (2013.01); *G09G 2310/027* (2013.01); *G09G 2310/0291* (2013.01); *G09G 2310/0297* (2013.01); *G09G 2340/08* (2013.01); *G09G 2370/12* (2013.01)

(58) Field of Classification Search

CPC ........ G09G 3/20; G09G 3/3685; G09G 5/026; G09G 3/3275; G09G 3/2003; G09G 2340/08; G09G 2370/12; G09G 2310/0297; G09G 2310/0291; G09G 2310/027

See application file for complete search history.

(56) References Cited

U.S. PATENT DOCUMENTS 6,727,880 B2 4/2004 Lee
7,920,138 B2 * 4/2011 Kim .................... G09G 3/3648 345/209
8,098,219 B2 * 1/2012 Kim .................... G02F 1/13624 345/87
8,207,929 B2 6/2012 Huang et al.
8,537,092 B2 9/2013 Woo et al.
8,717,274 B2 5/2014 Lin et al.

(Continued)

FOREIGN PATENT DOCUMENTS

KR 20130107559 A 10/2013
KR 101451589 B1 10/2014
KR 20150012549 A 2/2015

*Primary Examiner* — Erin M File

(74) *Attorney, Agent, or Firm* — Renaissance IP Law Group LLP

(57) ABSTRACT

A display apparatus includes a display driving circuit and a controller. The display driving circuit includes a data driver to sequentially drive a plurality of pixel groups during one horizontal period in a time-division manner. The pixel groups are included in each of the horizontal lines of a display panel. The controller analyzes a pattern of received image data and determines a driving sequence of the plurality of pixel groups of each horizontal line based on a result of the analysis of the pattern of received image data.

11 Claims, 25 Drawing Sheets

(56) References Cited

U.S. PATENT DOCUMENTS

| | | | | |
|---|---|---|---|---|
| 8,760,379 | B2 | 6/2014 | Choi | |
| 9,485,482 | B2 * | 11/2016 | Kurahashi | H04N 9/045 |
| 9,717,445 | B2 * | 8/2017 | Koehler | A61B 5/14532 |
| 2005/0179679 | A1 * | 8/2005 | Hosaka | G09G 3/3611 345/204 |
| 2005/0270059 | A1 * | 12/2005 | Ando | G09G 3/006 324/760.01 |
| 2010/0194734 | A1 * | 8/2010 | Morita | G09G 3/3685 345/211 |
| 2012/0169788 | A1 * | 7/2012 | Jang | G09G 3/3614 345/690 |
| 2012/0305749 | A1 * | 12/2012 | Mihara | H04N 5/353 250/208.1 |
| 2013/0307838 | A1 | 11/2013 | Kim et al. | |
| 2013/0314394 | A1 * | 11/2013 | Chaji | G09G 3/00 345/212 |
| 2014/0160172 | A1 | 6/2014 | Lee | |
| 2014/0176516 | A1 * | 6/2014 | Kim | G09G 3/3233 345/204 |
| 2014/0320464 | A1 | 10/2014 | Ryu et al. | |
| 2015/0002503 | A1 | 1/2015 | Park et al. | |
| 2015/0029233 | A1 * | 1/2015 | Bae | G09G 5/04 345/690 |
| 2015/0062192 | A1 * | 3/2015 | Kim | G09G 3/3291 345/690 |
| 2015/0294616 | A1 * | 10/2015 | Jang | G09G 3/3208 345/691 |
| 2016/0209808 | A1 * | 7/2016 | Byun | G03H 1/2294 |
| 2016/0260376 | A1 * | 9/2016 | Shin | G09G 3/2022 |

* cited by examiner

<Frame Data>

<Frame Data>

1000e

DISPLAY DRIVING CIRCUIT AND DISPLAY APPARATUS INCLUDING THE SAME

CROSS-REFERENCE TO RELATED APPLICATION

This application claims the benefit of Korean Patent Application No. 10-2015-0120544, filed on Aug. 26, 2015, in the Korean Intellectual Property Office, the disclosure of which is incorporated herein in its entirety by reference.

BACKGROUND

The inventive concept relates to a semiconductor device, and more particularly, to a display driving circuit and a display apparatus including a display driving circuit that drives a display panel to display an image on the display panel.

A display apparatus includes a display panel that displays an image, and a display driving circuit that drives the display panel. The display driving circuit receives image data from an external host and applies an image signal, corresponding to the received image data, to a data line of the display panel, thereby driving the display panel. Recently, as the size and resolution of the display panel increases, various approaches for reducing power consumption of the display driving circuit are being considered.

SUMMARY

The inventive concept provides a display driving circuit and a display apparatus including a display driving circuit in which dynamic consumption power is reduced and a heating characteristic is enhanced.

According to an aspect of the inventive concept, a display driving circuit includes a data driver to sequentially drive a plurality of pixel groups in a time-division manner during one horizontal period, in which the plurality of pixels are included in each horizontal line of a display panel; and a controller to analyze a pattern of received image data to be displayed on the display panel, and to determine a driving sequence of the plurality of pixel groups of each horizontal line based on a result of the analysis.

According to another aspect of the inventive concept, a display apparatus includes: a display panel to include a plurality of pixels; a timing controller to determine a driving sequence of a plurality of pixel groups that is sequentially driven during one horizontal period in a time-division manner based on image data to be displayed by the display panel and to generate a selection signal based on the driving sequence; a data driver to output image signals corresponding to the plurality of pixel groups based on the driving sequence; and a data switching unit to sequentially select a plurality of data lines based on the selection signal and to supply the image signals that are output from the data driver to the selected plurality of data lines.

According to yet another aspect of the inventive concept, a display apparatus comprises: a display panel comprising a plurality of pixels arranged in horizontal rows and vertical columns in which each horizontal row comprising a plurality of pixel groups; a controller to determine a driving sequence based on received image data; and a data driver coupled to the controller and responsive to the driving sequence to drive the plurality of pixel groups of a horizontal row sequentially in a time-division manner during one horizontal period based on the driving sequence. The controller may determine the driving sequence of a current horizontal row based on a difference between received image data for a pixel group that was driven last in a horizontal row that was immediately preceding the current horizontal row and received image data for a selected pixel group of the current horizontal row. The data driver may comprise a plurality of output signals, each output signal being selectable to drive a pixel group of a horizontal row based on the driving sequence. In one embodiment, each pixel group may comprise a Red-Green-Blue (RGB) stripe structure arrangement of pixels. In another embodiment, each pixel group may comprise a Red-Green-Blue-Green pentile structure arrangement of pixels.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
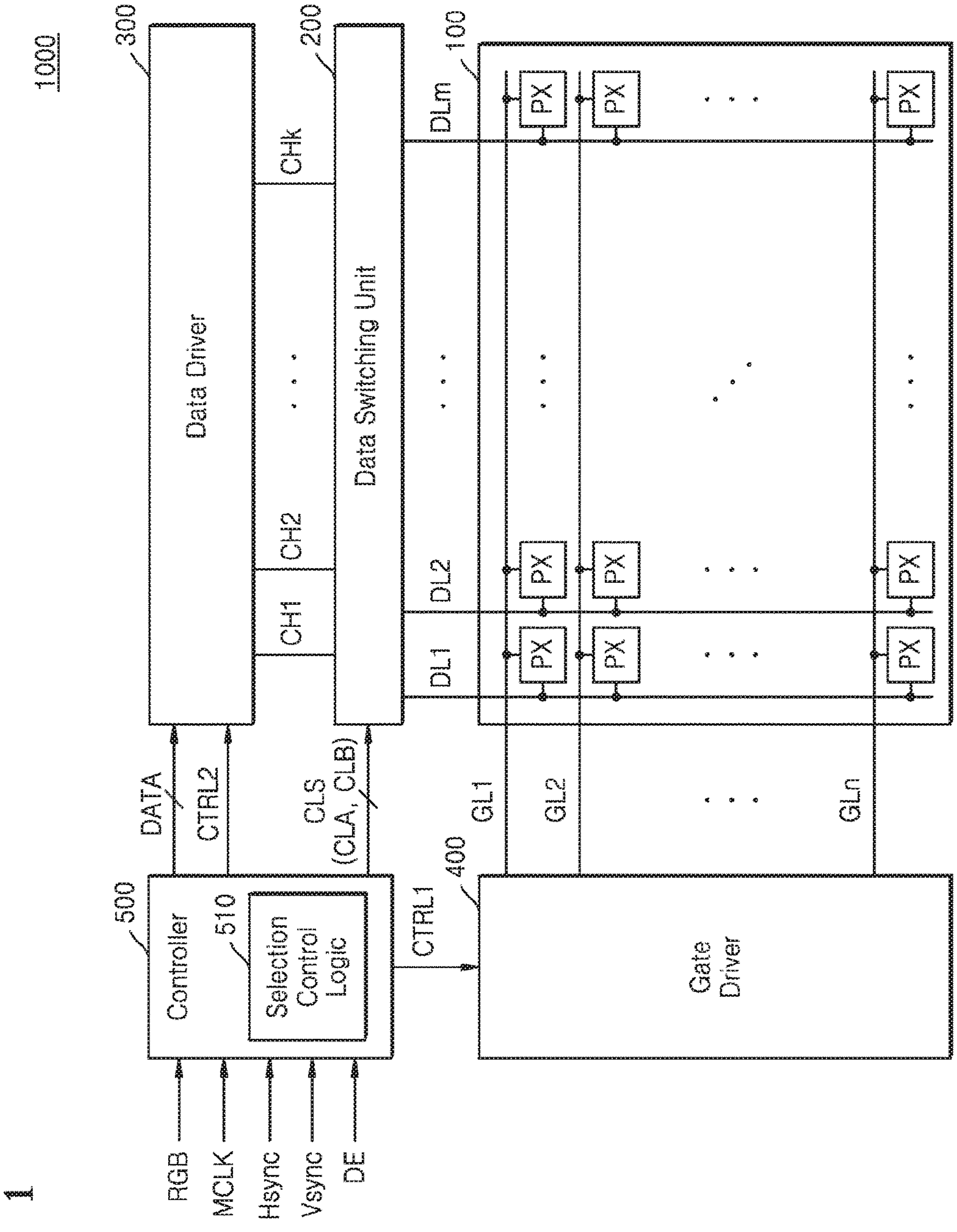
FIG. 1 is a block diagram illustrating a display apparatus according to an embodiment.

As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments of the inventive concept will be described in detail with reference to the accompanying drawings. Embodiments of the inventive concept are provided so that this disclosure will be thorough and complete, and will fully convey the concept of the inventive concept to one of ordinary skill in the art. Since the inventive concept may have diverse modified embodiments, preferred embodiments are illustrated in the drawings and are described in the detailed description of the inventive concept. However, this does not limit the inventive concept within specific embodiments and it should be understood that the inventive concept covers all the modifications, equivalents, and replacements within the idea and technical scope of the inventive concept. Like reference numerals refer to like elements throughout.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In various embodiments of the disclosure, the meaning of "comprise," "include," or "have" specifies a property, a region, a fixed number, a step, a process, an element and/or a component, but does not exclude other properties, regions, fixed numbers, steps, processes, elements and/or components.

As used herein, the term "or" includes any and all combinations of one or more of the associated listed items. For example, "A or B" may include A, include B, or include A and B.

It will be understood that, although the terms first, second, etc. used herein may qualify various elements according to various embodiments, these elements should not be limited by these terms. For example, the terms do not limit the order and/or importance of corresponding elements. These terms are only used to distinguish one element from another. For example, a first user equipment and a second user equipment are user equipment and denote different user equipment. For example, a first element may be referred to as a second element without departing from the spirit and scope of the inventive concept, and similarly, the second element may also be referred to as the first element.

In the case in which a component is referred to as being "connected" or "accessed" to other component, it should be understood that not only the component is directly connected or accessed to the other component, but also there may exist another component between the components. Meanwhile, in the case in which a component is referred to as being "directly connected" or "directly accessed" to other component, it should be understood that there is no component therebetween.

In the following description, the technical terms are used only for explain a specific embodiment while not limiting the inventive concept. The terms of a singular form may include plural forms unless referred to the contrary.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device according to various embodiments may be an electronic device that includes an image display function. For example, such an electronic device may be, but is not limited to, a smartphone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

An electronic device according to some embodiments may be a smart home appliance that includes an image display function. The smart home appliance may be, but is not limited to, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

An electronic device according to some embodiments may be, but is not limited to, a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, an automated teller machine (ATM), a point of sales (POS), and/or the like.

An electronic device according to some embodiments may be, but is not limited to, furniture, part of a building/structure, an electronic board, electronic signature receiving device, a projector, various measuring devices (e.g., water, electricity, gas or electro-magnetic wave measuring devices), and/or the like that includes an image display function. The electronic device according to some embodiments may be any combination of the foregoing devices. Also, the electronic device according to various embodiments may be a flexible device. Additionally, it will be apparent to one having ordinary skill in the art that the electronic device according to various embodiments of the present disclosure is not limited to the foregoing devices.

Hereinafter, an electronic device according to various embodiments will be described in detail with reference to the accompanying drawings. A user used herein may denote a person who uses the electronic device or a device (for example, an artificial intelligence electronic device) that uses the electronic device.

FIG. 1 is a block diagram illustrating a display apparatus 1000 according to an embodiment.

Referring to FIG. 1, the display apparatus 1000 may include a display panel 100, a data switching unit 200, a data driver 300, a gate driver 400 and a controller 500. In an embodiment, the gate driver 400 and/or the data switching unit 200 may be provided on the display panel 100. That is, in an embodiment, the gate driver 400 and/or the data switching unit 200 may be integral to the display panel 100.

The display panel 100 may include a plurality of pixels PX that are arranged in a matrix form, and may display an image in units of a frame. For example, the display panel 100 may be implemented as, but is not limited to, a liquid crystal display (LCD), a light-emitting diode (LED) display, an organic light-emitting diode (OLED) display, an active-matrix OLED (AMOLED) display, an electrochromic display (ECD), a digital mirror device (DMD), an actuated mirror device (AMD), a grating light valve (GLV), a plasma display panel (PDP), an electroluminescent display (ELD), or a vacuum fluorescent display (VFD). Also, the display panel 100 may be implemented with as a flat panel display, a flexible display, etc. For convenience, an OLED panel will be described herein as an example of an embodiment.

The display panel 100 may include a plurality of gate lines GL1 to GLn that are arranged in a (horizontal) row direction, a plurality of data lines DL1 to DLm that are arranged in a (vertical) column direction, and a plurality of pixels PX that are respectively provided in a plurality of pixel areas that are defined by intersections of the gate lines GL1 to GLn and the data lines DL1 to DLm. The display panel 100 may include a plurality of horizontal lines (or rows), and one horizontal line (or row) may include a plurality of pixels PX connected to one gate line. Pixels PX of one horizontal line may be driven during one horizontal period, and during another horizontal period, pixels PX of another horizontal line may be driven.

Pixels PX (hereinafter referred to as a red pixel, a green pixel, and a blue pixel) that respectively emit red (R) light, green (G) light, and blue (B) light may be arranged repeatedly in the display panel 100. In an embodiment, the pixels PX may be arranged repeatedly in an order of R, G and B, or, alternatively, in an order of B, G and R. Such an arrangement structure of the pixels PX may be referred to as an RGB stripe structure. In another embodiment, the pixels PX may be arranged repeatedly in an order of R, G, B and G, or, alternatively, in an order of B, G, R and G. Such an arrangement structure of the pixels PX may be referred to as a pentile structure. In a configuration in which the display panel 100 has the pentile structure, odd lines may include pixels PX that are arranged repeatedly in the order of R, G, B and G, and even lines may include pixels PX that are arranged repeatedly in the order of B, G, R and G.

The pixels PX may each include a light-emitting diode and a driving circuit that independently drives the light-emitting diode. That is, each of the pixels PX may include a diode driving circuit that is connected to one gate line and one data line, and a light-emitting diode that is connected between the diode driving circuit and a source voltage terminal (for example, a ground voltage).

The diode driving circuit may include a switching element connected to one gate line, and for example, may include a thin-film transistor (TFT). If the switching element is turned on, or becomes conductive, in response to a gate-on signal applied from the gate line, the diode driving circuit may supply an image signal (or a pixel signal), received from a data line connected to the diode driving circuit, to the light-emitting diode. The light-emitting diode may output a light signal corresponding to the image signal.

The gate driver 400 may sequentially supply the gate-on signal to the gate lines GL1 to GLn in response to a gate control signal CTRL1. For example, the gate control signal CTRL1 may include a gate start pulse GSP that indicates an output start of the gate-on signal, and a gate shift clock GSC that controls an output time of the gate-on signal, and/or the like. If the gate start pulse GSP is applied to the gate driver 400, the gate driver 400 may sequentially generate the gate-on signal (for example, a low-level gate voltage) in response to the gate shift clock GSC and may sequentially supply the gate-on signal to the gate lines GL1 to GLn. In this case, during a period in which the gate-on signal is not supplied to the gate lines GL1 to GLn, a gate-off signal (for example, a high-level gate voltage) may be supplied to the gate lines GL1 to GLn. It should be understood that in an alternative embodiment, the level of the gate-on signal may be a high-level signal and the level of the gate-off signal may be a low-level signal.

In response to a data control signal CTRL2, the data driver 300 may convert image data DATA into analog image signals (for example, grayscale voltages corresponding to pixel data) and may output the image signals through a plurality of channels CH1 to CHk. For example, the data control signal CTRL2 may include a source start pulse SSP, a source shift clock SSC, a source output enable signal SOE and/or the like. The data driver 300 may supply image signals for one horizontal line to the data lines DL1 to DLm during one horizontal period (or a horizontal display period).

Figure 2:
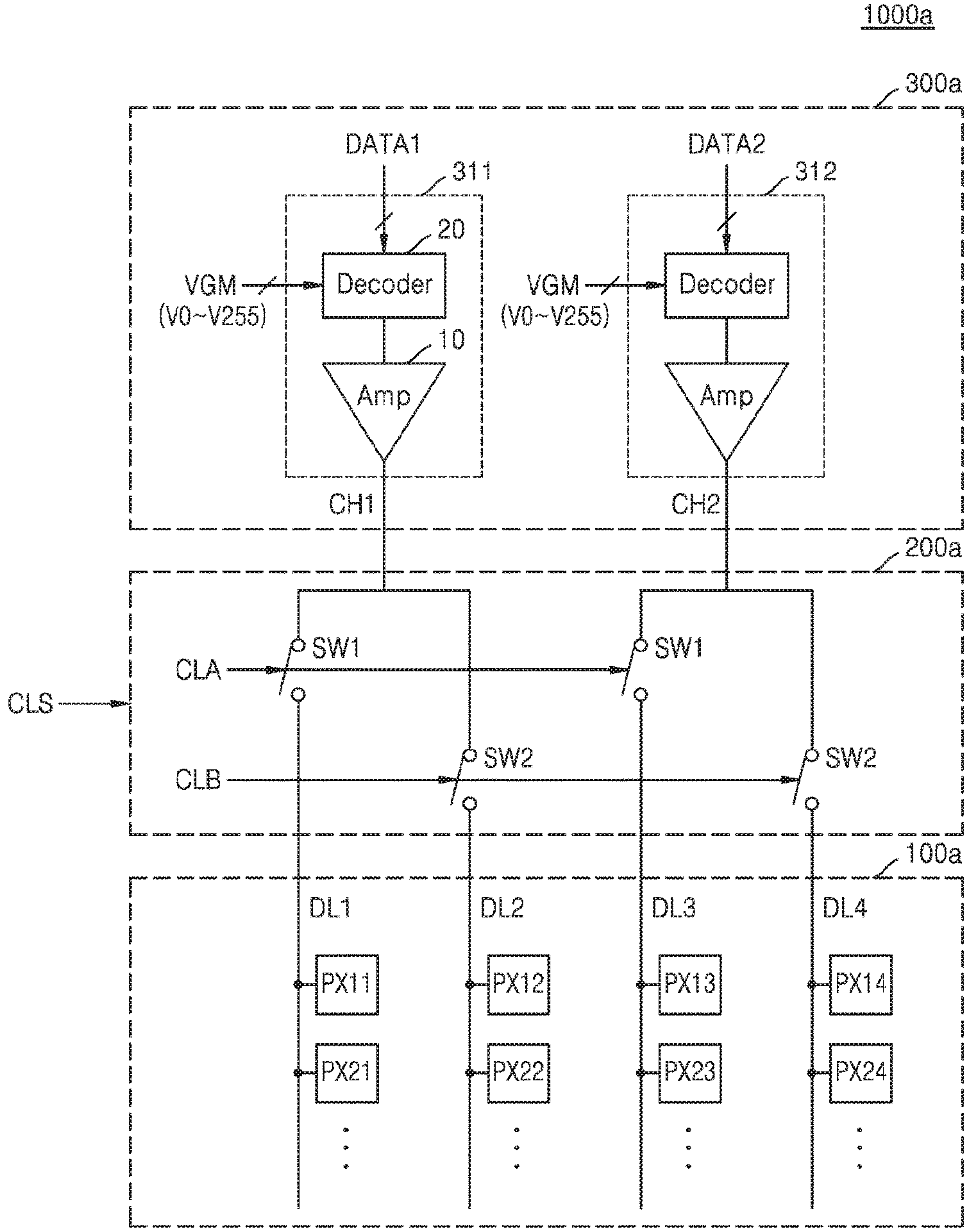
FIG. 2 is a circuit diagram illustrating an implementation example of a display apparatus according to an embodiment.

In the present embodiment, the data driver 300 may include a plurality of driving units (311 and 312 of FIG. 2). Each of the driving units may sequentially drive at least two pixels PX connected to the same gate line during one horizontal period in a time-division manner. Therefore, the data driver 300 may sequentially drive at least two pixel groups of one horizontal line during one horizontal period. For example, if there are two pixel groups, the data driver 300 may drive one pixel group during half (½) of one horizontal period, and during the other half (½) of the horizontal period, the data driver 300 may drive the other pixel group, thereby sequentially driving two pixel groups during one horizontal period in a time-division manner within the horizontal period.

In an embodiment, pixels PX arranged in an odd row may constitute one pixel group, and pixels PX arranged in an even row may constitute the other pixel group. In another embodiment, different pixel groups may comprise 3M-2nd-disposed pixels, 3M-1st-disposed pixels, or 3Mth-disposed pixels (in which M is a positive integer). Alternatively, different pixel groups may comprise 4M-3rd-disposed pixels, 4M-2nd-disposed pixels, 4M-1st-disposed pixels, or 4Mth-disposed pixels.

The data switching unit 200 may include a plurality of multiplexers that each includes a plurality of switching elements. The data switching unit 200 may sequentially connect each of the channels CH1 to CHk to at least two data lines according to selection signals CLS input from the controller 500. Therefore, during one horizontal period, image signals output from the data driver 300 may be supplied sequentially to at least two pixel groups through the data switching unit 200 in a time-division manner.

As described above, the data switching unit 200 may sequentially select a plurality of pixel groups according to the selection signals CLS.

For example, if the selection signals CLS include a first selection signal CLA and a second selection signal CLB, the data switching unit 200 may connect the channels CH1 to CHk to the data lines DL1, DL3, . . . DLm−1 of an odd column in response to the first selection signal CLA and then may connect the channels CH1 to CHk to the data lines DL2, DL4, . . . DLm of an even column in response to the second selection signal CLB. That is, pixels (i.e., a first pixel group) connected to the data lines of the odd column may be selected, and then, pixels (i.e., a second pixel group) connected to the data lines of the even column may be selected.

The controller 500 may receive control signals (for example, a horizontal synchronization signal Hsync, a vertical synchronization signal Vsync, a clock signal CLK, and a data enable signal DE) from an external device (for example, a host device (not shown) and may generate control signals CTRL1, CTRL2 and CLS for controlling the gate driver 400, the data driver 300, and the data switching unit 200 based on the received controls signals. Various operational timings of the gate driver 400, the data driver 300, and the data switching unit 200 may be controlled according to the control signals CTRL1, CTRL2 and CLS. The controller 500 may be referred to as a timing controller.

Moreover, the controller 500 may receive video data RGB from the external device and may image process the received video data RGB or convert the video data RGB to be suitable for a pixel structure of the display panel 100, thereby generating image data DATA. The controller 500 may transfer the image data DATA to the data driver 300.

The controller 500 according to an embodiment may determine a driving sequence of pixel groups of one horizontal line based on a pattern of an image that is to be displayed by the display panel 100. As described above, each of the driving units of the data driver 300 may temporally divide one horizontal period to drive at least two pixel groups. In this case, an output signal of the data driver 300 may swing widely depending on an image pattern, and for this reason, dynamic power consumption may be increased. The controller 500 may analyse the image pattern, and in order to reduce the dynamic power consumption, the controller 500 may adjust a driving sequence of pixel groups of each horizontal line to reduce the swing of the output of the data driver 300 and to therefore reduce the dynamic power consumption.

The controller 500 may generate the selection signals CLS for selecting pixel groups based on the determined driving sequence. In an embodiment, the selection signals CLS may include the first selection signal CLA and the second selection signal CLB. The first pixel group may be selected in response to the first selection signal CLA, and the second pixel group may be selected in response to the second selection signal CLB. The controller 500 may determine a driving sequence of the first and second pixel groups of each horizontal line and may determine a sequence in which the first selection signal CLA and the second selection signal CLB are selected during a horizontal line based on the driving sequence. In this case, generation of the selection signals CLS denotes generation of an on pulse that activates, or turns on, an element (for example, a switch) receiving the selection signals CLA and CLB.

The controller 500 may include a selection control logic 510 for analyzing a pattern of an image to determine a driving sequence for pixel groups. The selection control logic 510 may compare data of the pixel groups to determine a comparison value and may determine the driving sequence based on the determined comparison value. Also, the selection control logic 510 may generate the selection signals CSL for selecting the pixel groups based on the driving sequence.

The selection control logic 510 may determine a selection sequence in order for the pixel groups to be selected based on an ascending sequence of the comparison value. In an embodiment, the selection control logic 510 may determine data differences between data of a pixel group, which was driven last in an N−1 st horizontal line, and data of pixel groups of an Nth horizontal line, and may determine a driving sequence to selectively drive a pixel group in which a data difference between two pixel groups is relatively small.

In another embodiment, the selection control logic 510 may determine the data differences between the data of the pixel group that was driven last in the N−1 st horizontal line and the data of the pixel groups of the Nth horizontal line, and may select a pixel group in which a data difference is the smallest as a pixel group that will be driven first in the Nth horizontal line. Also, the selection control logic 510 may determine data differences between the selected pixel group and the other pixel groups and may select a pixel group in which a data difference is the smallest as a pixel group that is driven second in the Nth horizontal line.

As described above, the selection control logic 510 may compare data of pixel groups of a horizontal line and data of a pixel group of a previous horizontal line and/or may compare data between pixel groups to determine a driving sequence of pixel groups.

In an embodiment, the selection control logic 510 may compare a maximum value of the determined data differences with a threshold value, and if the maximum value is less than the threshold value, the selection control logic 510 may apply a predetermined driving sequence to a driving operation.

As described above, in the display apparatus 1000 according to an embodiment, the data driver 300 may sequentially drive pixel groups of a horizontal line during one horizontal period in a time-division manner During each horizontal period, the controller 500 may control a driving sequence of pixel groups of the horizontal line based on an image pattern. In a driving method (hereinafter referred to as a display-driving method) of the display apparatus 1000 according to an embodiment, as a range of the swing of the output signal of the data driver 300 is reduced, a dynamic power consumption of the data driver 300 and the display apparatus 1000 may be reduced. Also, since the dynamic power consumption may be reduced, the amount of heat emitted from the display apparatus 1000 may be reduced.

Although not shown, the display apparatus 1000 may further include a voltage generator and an interface. The voltage generator may generate various voltages applied to the display panel 100 and the driving circuits 200, 300 and 400.

The interface may include, for example, an RGB interface, a central processing unit (CPU) interface, a serial interface, a mobile display digital interface (MDDI), inter integrated circuit (I2C) interface, a serial peripheral interface (SPI), a micro controller unit (MDU) interface, a mobile industry processor interface (MIPI), an embedded display port (eDP) interface, a D-subminiature (D-sub) interface, an optical interface 4076, and/or a high definition multimedia interface (HDMI). Additionally or alternatively, the interface may include, for example, a mobile high-definition link (MHIL) interface, a secure digital (SD) card/multimedia card (MMC) interface, and/or infrared data association (IrDA) standard interface. In addition, the interface may include various serial or parallel interfaces.

In the present embodiment, the gate driver 400, the data driver 300, the data switching unit 200, and the controller 500 are depicted in FIG. 1 as different functional blocks. In an embodiment, the functional blocks or elements may be implemented as different semiconductor chips. In another embodiment, at least two of the gate driver 400, the data driver 300, the data switching unit 200 and the controller 500 may be implemented as one semiconductor chip. For example, the data driver 300 and the controller 500 may be integrated into one semiconductor chip. Also, some functional blocks or elements may be integrated into the display panel 100. For example, the gate driver 400 and/or the data switching unit 200 may be integrated into the display panel 100.

FIG. 2 is a circuit diagram illustrating an implementation example of a display apparatus 1000*a* according to an embodiment. FIG. 2 is a circuit diagram for illustrating in greater detail the data driver 300, the data switching unit 200 and the display panel 100. The details described above with reference to FIG. 1 may be applied to the present embodiment.

Referring to FIG. 2, the display apparatus 1000*a* may include a data driver 300*a*, a data switching unit 200*a* and a display panel 100*a*. In addition, the display apparatus 1000*a* may further include other functional blocks or elements depicted in FIG. 1.

The data driver 300*a* may include a plurality of driving units 311 and 312. In FIG. 2, for convenience of description, the data driver 300*a* is depicted as including two of the driving units 311 and 312. The number of the driving units may depend on a resolution of the display panel 100*a* and the number of data lines driven by each of the driving units.

The driving units 311 and 312 may each include a channel amplifier 10 and a decoder 20. The driving unit 311 may convert received data DATA1 into an image signal and may output the image signal through a channel CH1. Similarly, the driving unit 312 may convert received data DATA2 into an image signal and may output the image signal through a channel CH2.

The decoder 20 of the first driving unit 311 may receive a plurality of gamma voltages VGM and first data DATA1, and may select and output a gamma voltage corresponding to the first data DATA1 from the plurality of gamma voltages VGM. The plurality of gamma voltages VGM may include, for example, first to 256th voltages V0 to V255. In the display panel 100, gray scales of pixels PX are not linearly changed, but are nonlinearly changed based on voltage levels of image signals respectively applied to the pixels PX. In order to prevent image quality from being degraded due to a gamma characteristic, the plurality of gamma voltages VGM in which the gamma characteristic is reflected may be generated and applied to the decoder 20, and the decoder 20 may select, for example, a gamma voltage corresponding to the first data DATA1 to supply the selected gamma voltage to the channel amplifier 10.

The channel amplifier 10 may output the gamma voltage received from the decoder 20 as an image signal. The channel amplifier 10 may output an image signal through a corresponding channel.

The data switching unit 200*a* may include a plurality of first switches SW1 and a plurality of second switches SW2. The first switches SW1 and the second switches SW2 may each be implemented by MOSFET transistors. The first switches SW1 and the second switches SW2 may be respectively connected to the channels CH1 and CH2. The first switches SW1 and the second switches SW2 may be respectively connected to the data lines DL1 to DL4.

The first switches SW1 may be turned on, or become conductive, in response to a first selection signal CLA, and the second switches SW2 may be turned on, or become conductive, in response to a second selection signal CLB. Therefore, the first switch SW1 and the second switch SW2 that are connected to one channel may operate as a multiplexer that supplies the outputs of the driving units 311 and 312 to one of two data lines in response to the first and second selection signals CLA and CLB. The first switches SW1 and the second switches SW2 may be turned on at different times in one horizontal period in a time-division manner in response to the first and second selection signals CLA and CLB. Accordingly, image signals may be sequentially supplied to pixels of a horizontal line in a time-division manner during the horizontal line. For example, during a first half of the horizontal line, the output of the driving unit 311 may be applied to the first pixel PX11, and during the second half of the horizontal line, the output of the driving unit 311 may be applied to the second pixel PX12. Similarly, during the first half of the horizontal line, the output of the driving unit 312 may be applied to the third pixel PX13, and during the second half of the horizontal line, the output of the driving unit 312 may be applied to the fourth pixel PX14.

The display panel 100*a* may include a plurality of pixels of which only pixels PX11 to PX24 are indicated in FIG. 2 for convenience of description. The plurality of pixels PX11 to PX24 may receive image signals through the respectively corresponding data lines DL1 to DL4. The pixels PX11 to PX24 may be classified, or grouped, into a first pixel group that are connected to the plurality of first switches SW1 and a second pixel group that are connected to the plurality of second switches SW2. In FIG. 2, a plurality of pixels included in a pixel group and in a horizontal row may be simultaneously driven during one horizontal period. For example, during a first horizontal period, the pixels PX11 and PX13 in the first horizontal row may be simultaneously driven, followed by the pixels PX12 and PX14 in the first horizontal row being simultaneously driven. During a second horizontal period, the pixels PX21 and PX23 in the second horizontal row may be simultaneously driven, followed by the pixels PX22 and PX24 in the second horizontal row being simultaneously driven.

In the present embodiment, the driving units 311 and 312 of the data driver 300*a* may drive two data lines during one horizontal period based on a switching operation of the data switching unit 200. If a first channel CH1 is connected to a first data line DL1 in response to the first selection signal CLA during a horizontal period, the first driving unit 311 may drive a first pixel PX11. If a first channel CH1 is connected to a second data line DL2 in response to the second selection signal CLB, the first driving unit 311 may drive a second pixel PX12. The second driving unit 312 may also respectively drive a third pixel PX13 and a fourth pixel PX14 in the horizontal period in response to the first selection signal CLA and the second selection signal CLB.

As described above with reference to FIG. 1, the controller 500 (see FIG. 1) may determine a driving sequence of pixels for a horizontal line based on an image pattern, and may generate the first and second selection signals CLA and CLB indicating the driving sequence. The controller 500 may adjust a sequence in which the first selection signal CLA and the second selection signal CLB are generated in units of one horizontal line. In other words, the controller 500 may adjust a sequence in which pixels are selected that are to be driven in a time-division manner during a horizontal period.

For example, the first selection signal CLA may be generated prior to the second selection signal CLB during a first horizontal period, and during a second horizontal period, the second selection signal CLB may be generated prior to the first selection signal CLA. Therefore, during the first horizontal period, the data driver **300*a* may drive a first pixel group (i.e., the first pixel PX11 and the third pixel PX13) and then may drive a second pixel group (i.e., the second pixel PX12 and the fourth pixel PX14). Also, during the second horizontal period, the data driver 300*a* may drive the second pixel group (i.e., the second pixel PX12 and the fourth pixel PX14) and then may drive the first pixel group (i.e., the first pixel PX11 and the third pixel PX13**). As described above, a sequence in which pixels of each horizontal line are driven may be changed.

Figure 3A:
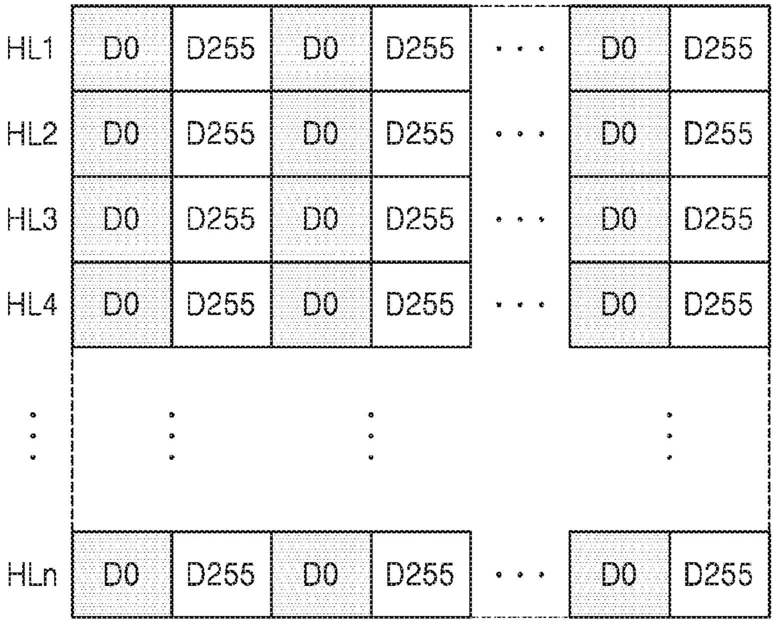
FIGS. 3A to 3D are diagrams for describing a driving waveform of the display apparatus of FIG. 2 as to an image having a certain pattern.
Figure 3B:
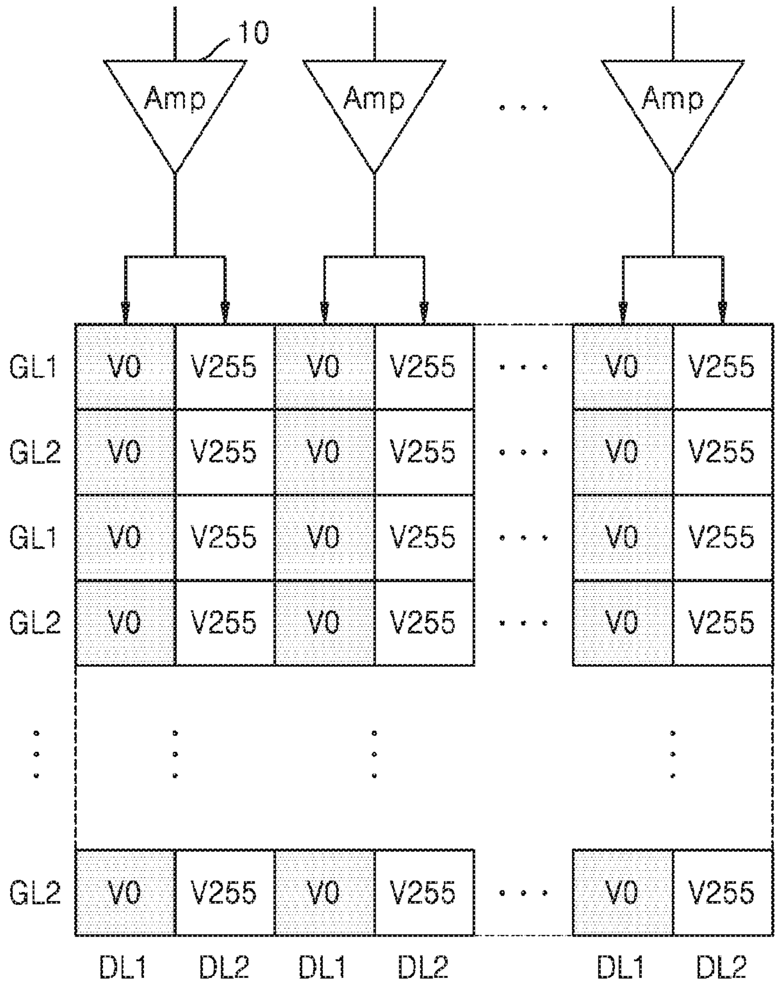
Figure 3C:
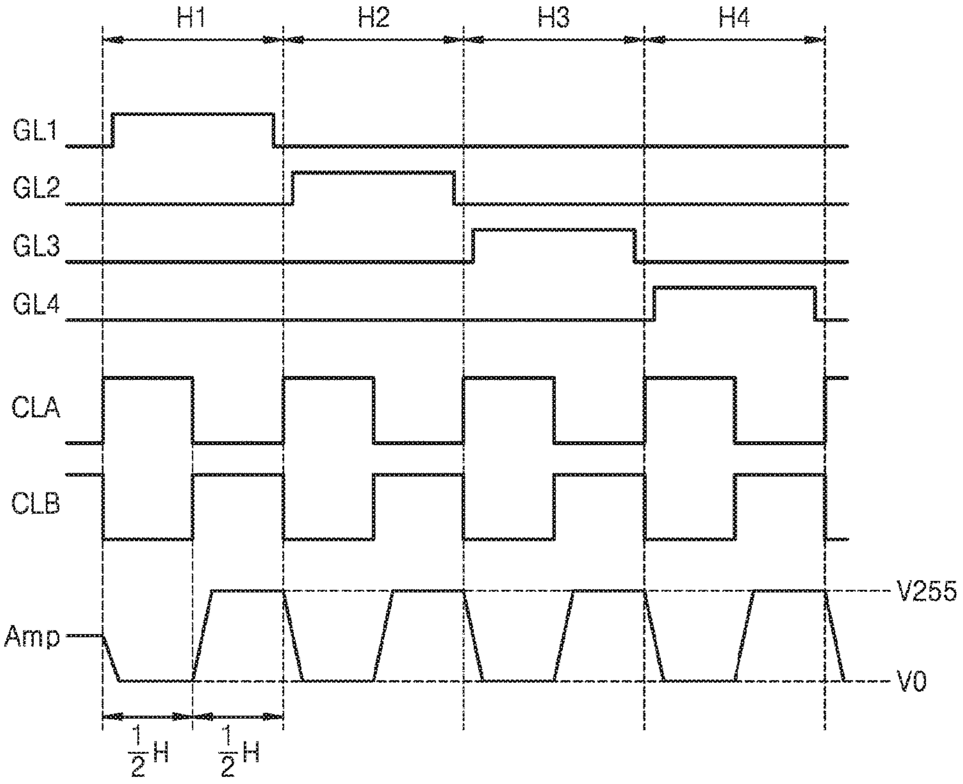
Figure 3D:
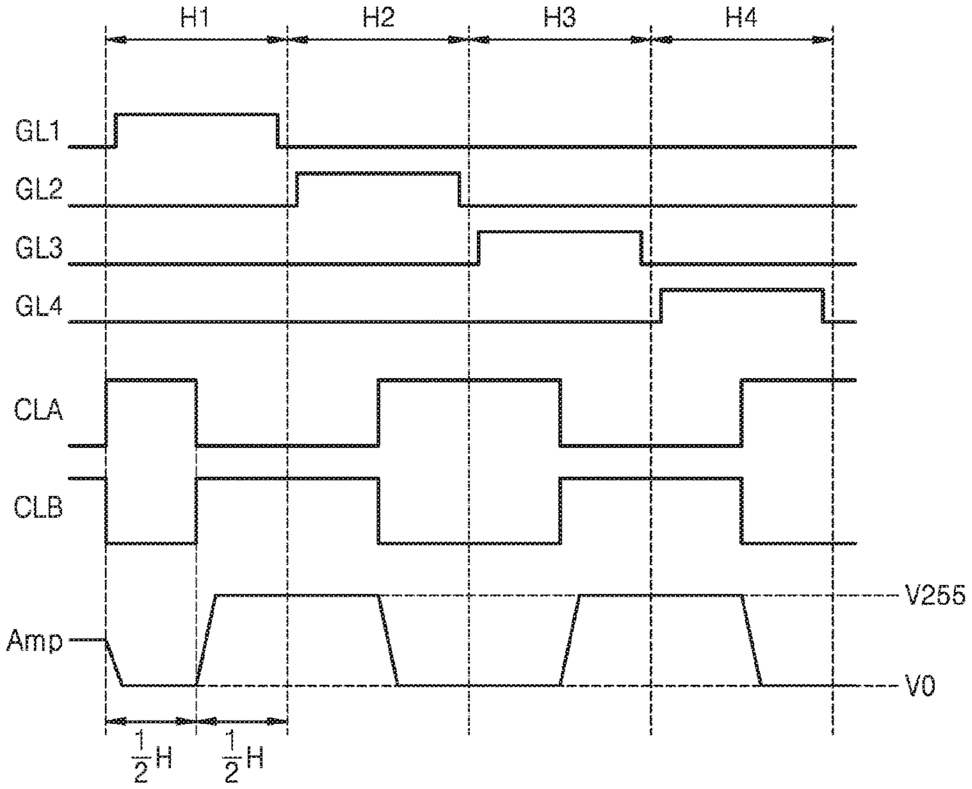

FIGS. 3A to 3D are diagrams to illustrate a driving waveform of the display apparatus of FIG. 2 for an image having a particular pattern. FIG. 3A depicts image data of one frame; FIG. 3B depicts gamma voltages that are applied to pixels of a display panel according to image data; FIG. 3C depicts an output waveform of a driving unit if a driving sequence of a pixel is fixed; and FIG. 3D depicts an output waveform of a driving unit if a driving sequence of a pixel is adjusted based on an image pattern according to an embodiment.

Referring to FIG. 3A, frame data may include pixel data indicating gray scales of the pixels PX of the display panel 100. For example, the pixel data may include pieces of data indicating a first to a 256th gray scale. Pixel data indicating the first gray scale may be referred to by DO, and pixel data indicating the 256th gray scale may be referred to by D255. As depicted in FIG. 3A for the particular pattern, pixel data of an odd column may be DO, pixel data of an even column may be D255. The frame data may indicate an image in which a gray scale difference between the odd column and the even column is a maximum. For example, if the display panel 100 is a panel having the pentile structure, a red pixel or a blue pixel may be disposed in the odd column, and a green pixel may be disposed in the even column. If the display panel 100 displays a green image, the frame data may include pixel data as depicted in FIG. 3A for an even column.

Gamma voltages depicted in FIG. 3B may be respectively applied to pixels based on the pixel data of FIG. 3A. A first gamma voltage V0 indicating a first gray scale may be applied to a pixel of an odd column, and a 256th gamma voltage V255 indicating the 256th gray scale may be applied to a pixel of an even column. As described above with reference to FIG. 2, in response to the control signals CLA and CLB, each of the channel amplifiers 10 may be sequentially connected to two data lines and may sequentially drive two pixels during one horizontal period in a time-division manner Therefore, during one horizontal period, each of the channel amplifiers 10 may output the first gamma voltage V0 and then may output the 256th gamma voltage V256, or alternatively may output the 256th gamma voltage V256 and then may output the first gamma voltage V0.

Referring to FIGS. 2 and 3C, the first selection signal CLA may be generated prior to the second selection signal CLB in each of horizontal periods H1 to H4. Therefore, in FIG. 3B, pixels of an odd column may be first driven, and pixels of an even column may be driven later. The first gamma voltage V0 may be applied to the pixels of an odd column, and the 256th gamma voltage V255 may be applied to the pixels of an even column.

However, in the display-driving method according to an embodiment, a driving sequence of pixels of each horizontal line may be determined based on an image pattern, and thus, the number of times an output of each of the channel amplifiers 10 swings widely is reduced. Referring to FIG. 3B, if a pixel receiving the first gamma voltage V0 of the pixels of a first horizontal line (H1) is driven first and a pixel receiving the 256th gamma voltage V255 is driven later during a first horizontal period, during a second horizontal period (H2), a pixel receiving the 256th gamma voltage V255 among pixels of a second first horizontal line may be driven first, and a pixel receiving the first gamma voltage V0 may be driven later. Also, during a third horizontal period (H3), a pixel receiving the first gamma voltage V0 among pixels of a third horizontal line is driven first, and a pixel receiving the 256th gamma voltage V255 is driven later. Therefore, pixels that have a small data difference from pixels that were driven last in a previous horizontal line may be driven first in a next horizontal line, and thus, the number of times each of the channel amplifiers 10 widely swings is minimized or reduced.

Referring to FIGS. 2 and 3D, during a first horizontal period H1, if pixels of an odd column are selected in response to the first selection signal CLA, each of the channel amplifiers 10 may output the first gamma voltage V0, and then, if pixels of an even column are selected in response to the second selection signal CLB, each of the channel amplifiers 10 may output the 256th gamma voltage V255. Unlike the first horizontal period H1, the pixels of an even column may be first selected in a second horizontal period H2. If pixels of the even column are selected in response to the second selection signal CLB, each of the channel amplifiers 10 may output the 256th gamma voltage V255, and then, if pixels of an odd column are selected in response to the first selection signal CLA, each of the channel amplifiers 10 may output the first gamma voltage V0.

Comparing an output waveform of each of the channel amplifiers 10 of FIG. 3C to the output waveform of each of the channel amplifiers 10 in FIG. 3D, it may be seen that in FIG. 3D the number of times an output waveform swings widely is reduced by half in comparison to the number of times an output waveform swings widely in FIG. 3C. Accordingly, dynamic power consumption of the display apparatus **1000*a* (see FIG. 2**) is reduced if the display-driving method disclosed herein is used.

Figure 4:
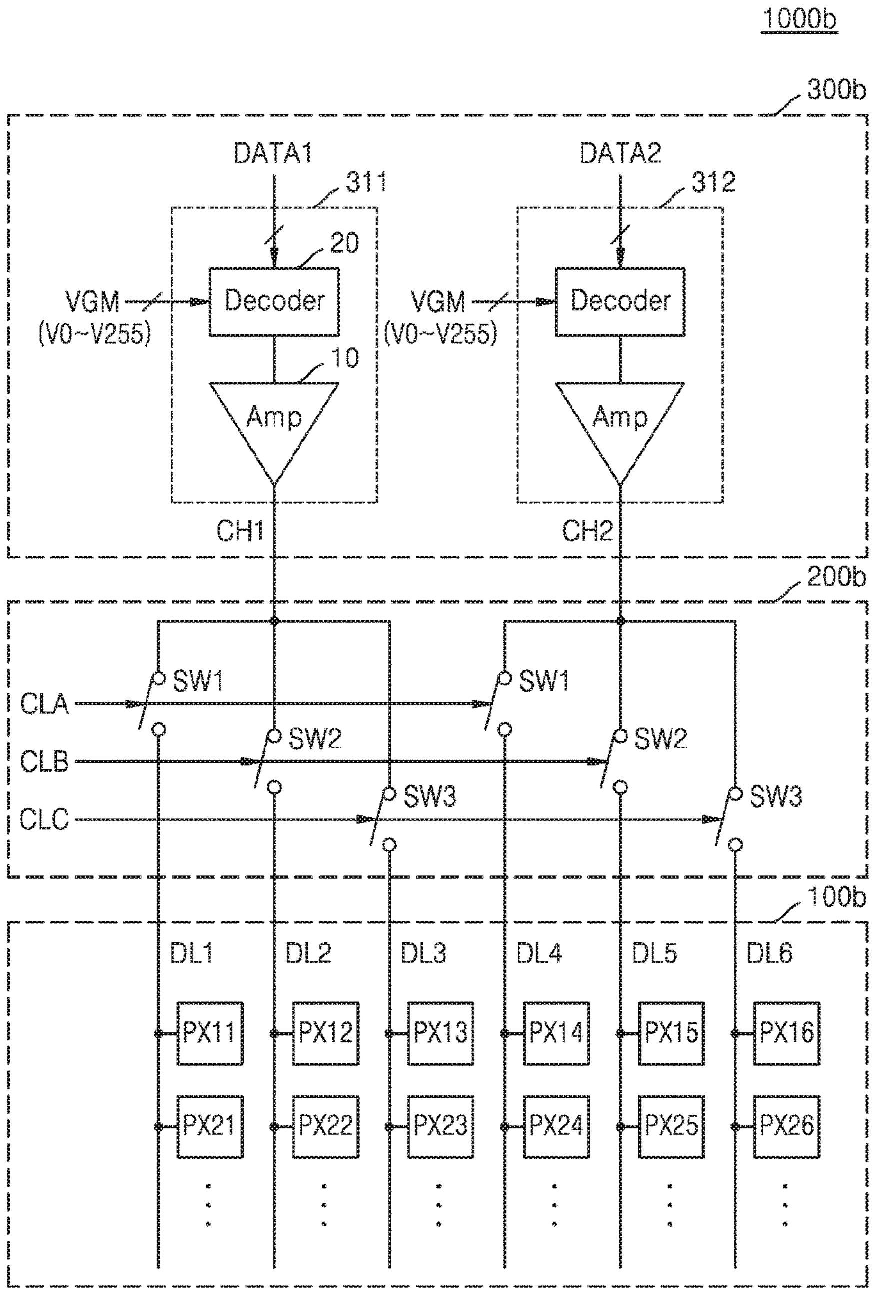
FIG. 4 is a circuit diagram illustrating an implementation example of a display apparatus according to an embodiment.

FIG. 4 is a circuit diagram illustrating an implementation example of a display apparatus **1000*b* according to an embodiment. FIG. 4 is a circuit diagram for illustrating in additional detail the data driver 300, the data switching unit 200 and the display panel 100. The details described above with reference to FIG. 1** may be applied to the present embodiment.

Referring to FIG. 4, the display apparatus **1000*b* may include a data driver 300*b*, a data switching unit 200*b* and a display panel 100*b*. Additionally, the display apparatus 1000*b* may further include other functional blocks or elements depicted in FIG. 1**.

In the present embodiment, a plurality of driving units 311 and 312 included in the data driver **300*b* may drive three data lines during one horizontal period. A first driving unit 311 may drive first to third data lines DL1 to DL3 during a horizontal period. Similarly, a second driving unit 312 may drive fourth to sixth data lines DL4 to DL6** during a horizontal period.

The data switching unit 200*b* may include a plurality of first switches SW1, a plurality of second switches SW2 and a plurality of third switches SW3. The first switches SW1, the second switches SW2 and the third switches SW3 may be implemented by MOSFET transistors. The plurality of first switches SW1, the plurality of second switches SW2 and the plurality of third switches SW3 may be respectively connected to channels CH1 and CH2. The plurality of first switches SW1, the plurality of second switches SW2 and the plurality of third switches SW3 may be respectively connected to the data lines DL1 to DL6.

The first switches SW1 may be turned on, or become conductive, in response to a first selection signal CLA, the second switches SW2 may be turned on, or become conductive, in response to a second selection signal CLB, and the third switches SW3 may be turned on, or become conductive, in response to a third selection signal CLC. Therefore, the first switch SW1, the second switch SW2 and the third switch SW3 that are connected to channel CH1 may operate as a multiplexer that supplies the output of the driving unit 311 to one of three data lines in response to the first to third selection signals CLA, CLB and CLC. Similarly, the first switch SW1, the second switch SW2 and the third switch SW3 that are connected to channel CH2 may operate as a multiplexer that supplies the output of the driving unit 312 to one of three data lines in response to the first to third selection signals CLA, CLB and CLC. The first switches SW1, the second switches SW2, and the third switches SW3 may be turned on at different times in one horizontal period in response to the first to third selection signals CLA, CLB and CLC. Accordingly, image signals may be sequentially supplied to pixels of a horizontal line in a time-division manner. For example, driving unit 311 may sequentially drive the first to third pixels PX11 to PX13 during a horizontal period in a time-division manner, and driving unit 312 may sequentially drive the fourth to sixth pixels PX15 to PX16 during the horizontal period in a time-division manner.

The display panel 100*b* may include a plurality of pixels of which pixels PX11 to PX26 are indicated in FIG. 4 for convenience of description. The plurality of pixels PX11 to PX26 may receive image signals through the respectively corresponding data lines DL1 to DL6. The pixels PX11 to PX26 may be classified, or grouped, into a first pixel group that is connected to the first switch SW1, a second pixel group that is connected to the second switch SW2, and a third pixel group that is connected to the third switch SW3. For example, in a first horizontal line, a first pixel PX11 and a fourth pixel PX14 of the first row that are connected to the first switch SW1 may be classified as the first pixel group, a second pixel PX12 and a fifth pixel PX15 of the first row that are connected to the second switch SW2 may be classified as the second pixel group, and a third pixel PX13 and a sixth pixel PX16 of the first row that are connected to the third switch SW3 may be classified as the third pixel group. Similarly, a first pixel PX21 and a fourth pixel PX24 of the second row may be classified as the first pixel group, a second pixel PX22 and a fifth pixel PX25 of the second row may be classified as the second pixel group, and a third pixel PX23 and a sixth pixel PX26 of the second row may be classified as the third pixel group. Pixels included in the same pixel group may be simultaneously driven during one horizontal period.

In the above-described display-driving method according to an embodiment, a driving sequence of the pixels PX11 to PX16 of one horizontal line and PX21 to PX26 of a next horizontal line may be determined based on an image pattern. This will be described with reference to FIG. 5.

Figure 5:
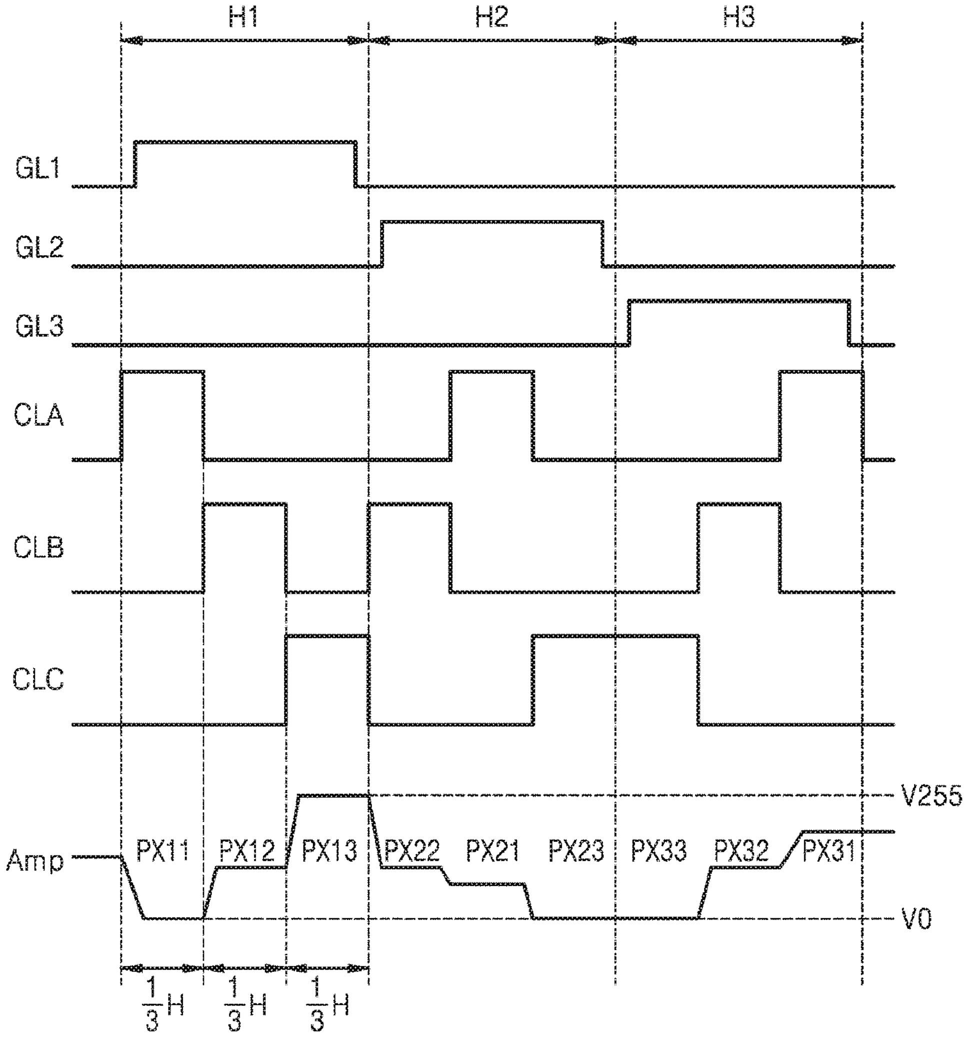
FIG. 5 shows an output waveform of a display apparatus according to an embodiment.

FIG. 5 shows an output waveform of a display apparatus according to an embodiment and, more specifically, shows an output waveform of the first driving unit 311 of FIG. 4.

Referring to FIG. 5, the first to third selection signals CLA, CLB and CLC may be generated at different times during a horizontal period. For example, the first to third selection signals CLA, CLB and CLC may be generated at every ⅓ horizontal period. A driving unit (for example, the first driving unit 311) may sequentially drive three pixels of one horizontal line in a time-division manner in response to the the first to third selection signals CLA, CLB and CLC. As shown, a channel amplifier 10 may be supplied to pixels corresponding to the first to third selection signals CLA, CLB and CLC during each horizontal period.

As described above, the controller 500 (see FIG. 1) may determine a pattern of image data, and in order for a waveform output from the channel amplifier 10 not to widely swing or in order for the number of swings to be reduced or minimized, the controller 500 may determine a driving sequence of pixels for each horizontal period and may generate the first to third selection signals CLA, CLB and CLC based on the driving sequence. For example, as shown in FIG. 5, in order for a swing range of an output of the channel amplifier 10 to be minimized or reduced, a driving sequence of a plurality of pixels PX11 to PX13, PX21 to PX23 and PX31 to PX33 may be determined. Furthermore, a sequence in which the first to third selection signals CLA, CLB and CLC are generated may be determined differently for each of horizontal periods H1 to H3 based on the driving sequence.

Figure 6A:
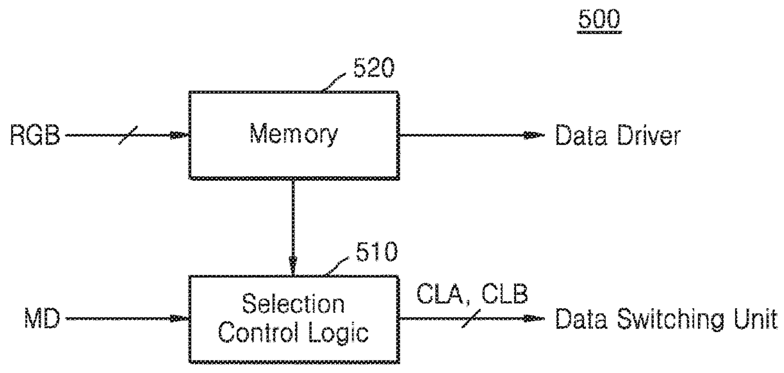
FIG. 6A is a block diagram schematically illustrating a controller according to an embodiment.

FIG. 6A is a block diagram schematically illustrating a controller 500 according to an embodiment.

Referring to FIG. 6A6, the controller 500 may include a memory 520 and a selection control logic 510.

The memory 520 may temporarily store video data RGB received from the external device in units of one frame or in units of a plurality of lines, and may transfer the video data RGB to the data driver 300 (see FIG. 1) or an image processor (not shown). The memory 520 may be a graphic random access memory (RAM) that stores data in units of one frame, or may be a line buffer that stores data in units of one horizontal line. The memory 520 may include a volatile memory, such as a dynamic RAM (DRAM), a static RAM (SRAM), or the like, and/or a nonvolatile memory, such as flash memory or the like. The memory 520 may be configured to include a DRAM, a phase-change random access memory (PRAM), a magnetoresistive random access memory (MRAM), a resistive random access memory (ReRAM), a ferroelectric random access memory (FRAM), a NOR flash memory, a NAND flash memory, a fusion flash memory (for example, a memory in which an SRAM buffer is combined with a NOR flash memory and a NAND flash memory), and/or the like.

The selection control logic 510 may determine a driving sequence of a plurality of pixel groups included in a horizontal line for each of the horizontal lines of the display panel 100 (see FIG. 1) based on the video data RGB supplied from the memory 520. As another example, the selection control logic 510 may determine a driving sequence of a plurality of pixel groups based on image data (for example, image data DATA (see FIG. 1) supplied to the data driver) generated by image-processing the video image RGB.

The selection control logic 510 may generate a plurality of selection signals (for example, a first selection signal CLA and a second selection signal CLB) based on the driving sequence. A sequence in which the selection signals (for example, the first selection signal CLA and the second selection signal CLB) are generated during each horizontal period may be changed based on a driving sequence that is determined for each horizontal period.

In an embodiment, the selection control logic 510 may selectively analyze a pattern of an image to determine a driving sequence of pixel groups or may determine the driving sequence of the pixel groups based on a predetermined sequence.

For example, the selection control logic 510 may analyze the pattern of the image to determine the driving sequence of the pixel groups, or may determine the driving sequence of the pixel groups based on a predetermined sequence in response to a selection by a user.

Figure 6B:
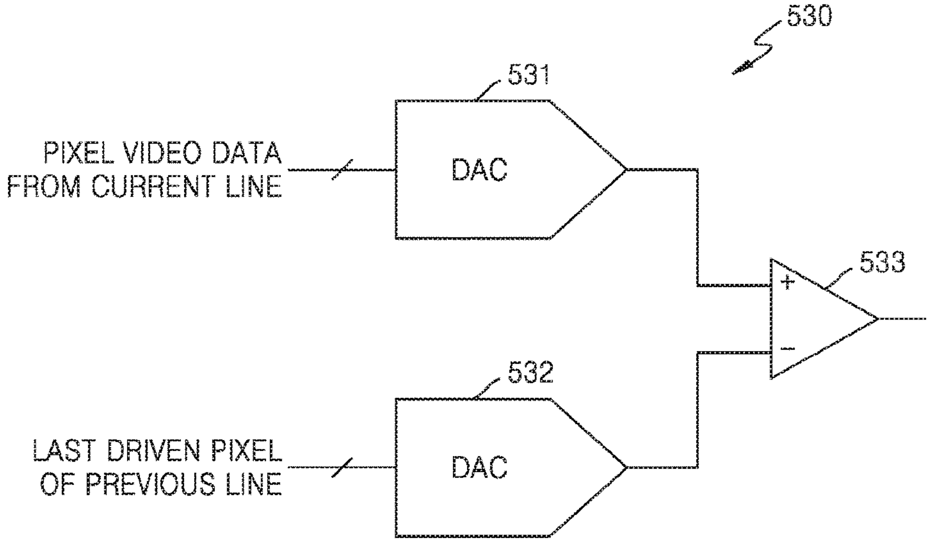
FIG. 6B is a block diagram schematically illustrating a portion of an analyzer according to an embodiment.

FIG. 6B is a block diagram schematically illustrating a portion of an analyzer 530 according to an embodiment. The analyzer 530 includes a first Digital-to-Analog Converter (DAC) 531 and a second DAC 532. The analyzer 531 receives digital video data for a pixel in a current horizontal line (i.e., the horizontal line N), and the analyzer 532 receives digital video data for the pixel of the previous horizontal line (i.e., horizontal line N−1). The DACs 531 and 532 respectively output analog signals that correspond to the input video data. The outputs of the DACs 531 and 532 are input to a comparator 533. The output of the comparator 533 indicates whether the video data for the pixel of the current horizontal line is greater than or less than the pixel of the previous horizontal line that was driven last. The selection control logic 510 uses the output of the comparator 533 as described with reference to FIGS. 7 to 12 to generate the sequence of the selection signals (i.e., the first selection signal CLA and the second selection signal CLB).

Figure 6C:
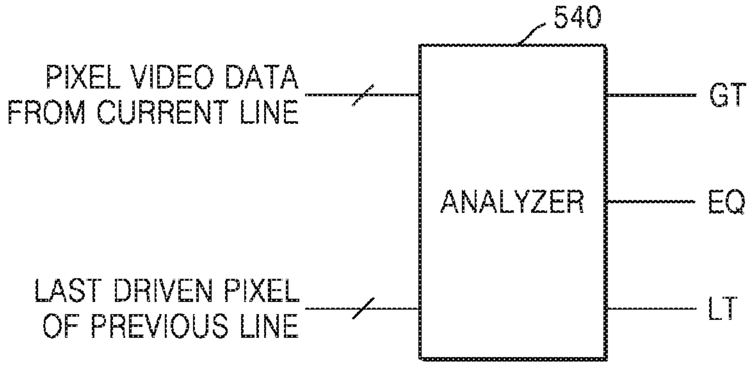
FIG. 6C is a block diagram schematically illustrating a portion of an analyzer according to an embodiment.

FIG. 6C is a block diagram schematically illustrating a portion of an analyzer 540 according to an embodiment. The analyzer 540 receives digital video data for a pixel in a current horizontal line (i.e., the horizontal line N), and digital video data for the pixel of the previous horizontal line (i.e., horizontal line N−1). In response to receiving the digital video data, the analyzer 540 outputs a Greater Than (GT) signal, an Equal (EQ) signal and a Less Than (LT) signal. The selection control logic 510 used the outputs of the analyzer 540 as described with reference to FIGS. 7 to 12 to generate the sequence of the selection signals (i.e., the first selection signal CLA and the second selection signal CLB).

Returning to FIG. 6A, the selection control logic 510 may receive an image mode signal MD. In response to an image mode signal MD, if video data RGB corresponds to a still image, the selection control logic 510 may analyze a pattern of an image to determine a driving sequence of pixel groups. If the video data RGB corresponds to a moving image, the selection control logic 510 may determine the driving sequence of the pixel groups based on a predetermined sequence in response to the image mode signal MD.

The image mode signal MD may be a signal indicating whether the image data RGB corresponds to a moving image or a still image. In an embodiment, the image mode signal MD may be received from the external device along with the video data RGB. In another embodiment, the controller 500 may internally generate the image mode signal MD.

In a moving image, it may be a low probability that a data difference between adjacent pixels is large. Therefore, if the video data RGB corresponds to the moving image, the selection control logic 510 may not analyze the image pattern and may determine a driving sequence of pixel groups based on a predetermined sequence. On the other hand, if the video data RGB corresponds to a still image, a data difference between adjacent pixels may be large depending on an image pattern. Therefore, if the video data RGB corresponds to the still image, the selection control logic 510 may analyze a pattern of an image to determine a driving sequence of pixel groups.

In an embodiment, if a still image is displayed by the display panel 100 (see FIG. 1) during a plurality of frame periods, the selection control logic 510 may perform an image pattern analyzing operation in a first frame period of the plurality of frame periods and may not perform the image pattern analyzing operation in another frame period. A driving sequence of pixel groups of each horizontal line that is determined for the first frame period may be applied to subsequent frame periods. Therefore, the number of operations of the selection control logic 510 relating to analyzing an image pattern may be reduced.

In the present embodiment, the controller 500 is illustrated as including the memory 520. However, in other embodiments, the controller 500 and the display apparatus 1000 (see FIG. 1) may not include the memory 520. The video data RGB received from the external device may be supplied to the data driver 300 in units of one horizontal line. The selection control logic 510 may receive the video data RGB, and by comparing pixel data in units of one horizontal line, the selection control logic 510 may analyze an image pattern.

Hereinafter, a method of determining, by the selection control logic 510, a driving sequence of pixels or a driving sequence of pixel groups based on a pattern of an image will be described with reference to FIGS. 7 to 12.

Figure 7:
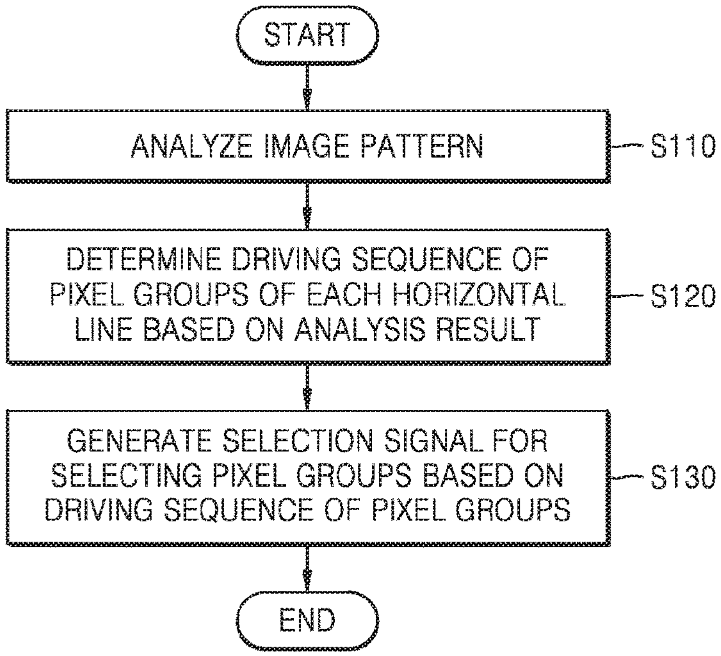
FIG. 7 is a flowchart illustrating an operation of a selection control logic according to an embodiment.

FIG. 7 is a flowchart illustrating an operation of the selection control logic 510 according to an embodiment.

Referring to FIG. 7, in operation S110, the selection control logic 510 may analyze an image pattern based on video data RGB received from an external device or image data DATA generated by image-processing the video data RGB. The selection control logic 510 may analyze the image pattern based on a data difference between pixels.

Subsequently, in operation S120, the selection control logic 510 may determine a driving sequence of pixel groups of each horizontal line based on a result of the analysis. The selection control logic 510 may determine the driving sequence of the pixel groups to minimize or reduce a swing range of each output of the data driver 300 (see FIG. 1) or to minimize or reduce the number of times each output swings.

In operation S130, the selection control logic 510 may generate a selection signal for selecting the pixel groups based on the driving sequence of the pixel groups. The selection signal may be supplied to the data switching unit 200 (see FIG. 1), and in response to the selection signal, the data switching unit 200 may select the pixel groups based on the determined driving sequence.

Figure 8:
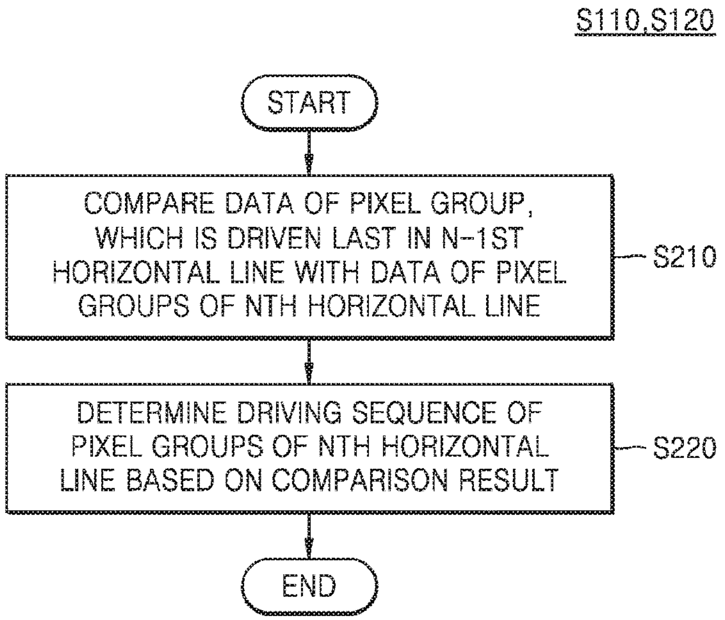
FIG. 8 is a flowchart illustrating in detail an image pattern analyzing operation and a driving sequence determining operation of FIG. 7.

FIG. 8 is a flowchart illustrating in detail an image pattern analyzing operation and a driving sequence determining operation of FIG. 7.

Referring to FIG. 8, in operation S210, the selection control logic 510 may compare data of a pixel group, which is driven last in an N−1st horizontal line, with data of pixel groups of an Nth horizontal line. For example, if each horizontal line includes a first pixel group and a second pixel group that are driven at different times during one horizontal period, the selection control logic 510 may compare data of a pixel group, which is driven later among the first and second pixel groups of a first horizontal line, with data of each of first and second pixel groups of a second horizontal line. For example, if the second pixel group is driven later in the first horizontal line, the selection control logic 510 may compare data of the second pixel group of the first horizontal line with data of the first pixel group of the second horizontal line to determine a first comparison value and may compare data of the second pixel group of the first horizontal line with data of the second pixel group of the second horizontal line to determine a second comparison value. For example, each of the first and second comparison values may be a difference between pieces of data.

In operation S220, the selection control logic 510 may determine a driving sequence of pixel groups of the Nth horizontal line based on a result of the comparison. The selection control logic 510 may determine a driving sequence in order for a pixel group, associated with a comparison value (i.e., a data difference) is relatively small, to be driven first. For example, if the first comparison value is greater than the second comparison value, the selection control logic 510 may determine a driving sequence in order for the second pixel group of the second horizontal line to be driven before the first pixel group.

Subsequently, in determining a driving sequence of pixel groups of a third horizontal line, the selection control logic 510 may determine the driving sequence through the above-described operations 210 and 220.

Figure 9A:
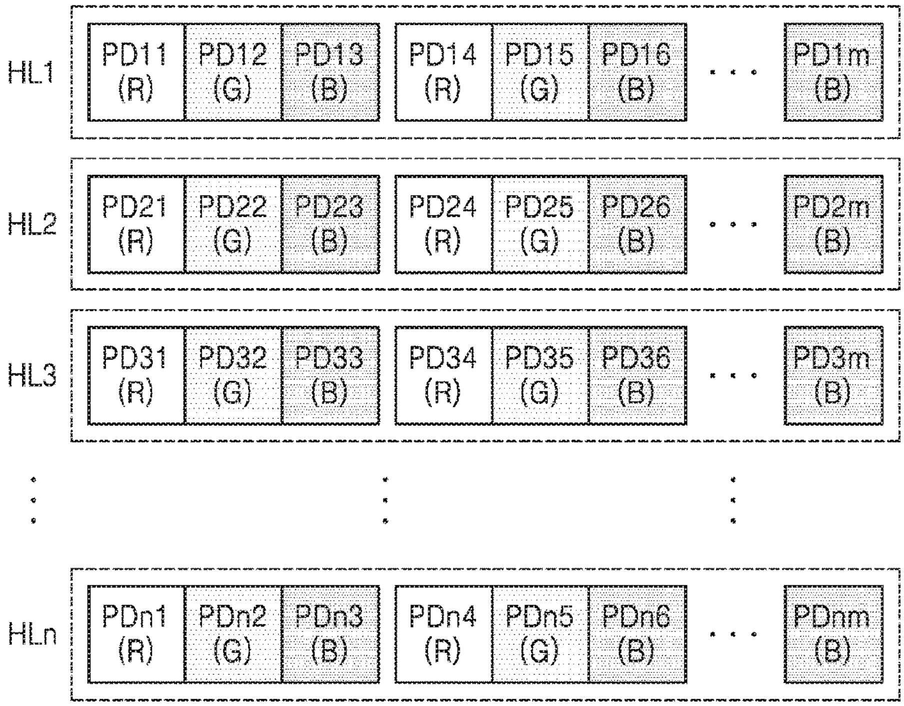
FIGS. 9A and 9B illustrate in detail a driving sequence determining method of FIG. 8.
Figure 9B:
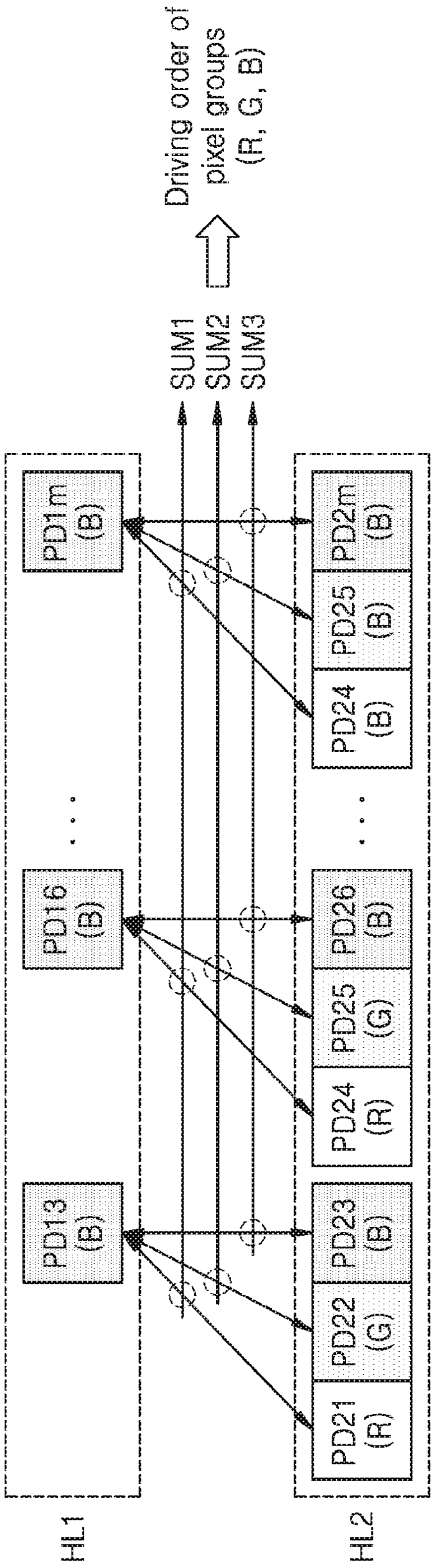

FIGS. 9A and 9B illustrate in greater detail a driving sequence determining method of FIG. 8. FIG. 9A illustrates exemplary frame data if a display panel includes three pixel groups, and FIG. 9B is a diagram illustrating details of the driving sequence determining method of FIG. 8 and, in particular, illustrates a method of determining a driving sequence of pixel groups of a second horizontal line.

Referring to FIG. 9A, frame data may include pixel data PD corresponding to the three pixel groups for each of horizontal lines HL1 to HLn. In an embodiment, the first pixel group may include a plurality of red pixels R, the second pixel group may include a plurality of green pixels G, and the third pixel group may include a plurality of blue pixels B.

A method of determining a driving sequence of pixel groups R, G and B of a second horizontal line HL2 will be described with reference to FIG. 9. For example, consider that in a first horizontal line HL1, the third pixel group B was driven last.

Referring to FIG. 9B, a controller may compare pixel data of each of first to third pixel groups R, G and B of the second horizontal line HL2 with pixel data PD13, PD16 and PD1*m* of a third pixel group B of the first horizontal line HL1 to determine a comparison result. For example, the controller may determine the respective data differences between pixel data PD21, PD24 and PD2*m*-2 of the first pixel group R of the second horizontal line HL2 and the pixel data PD13, PD16 and PD1*m* of the third pixel group B of the first horizontal line HL1. The controller may determine a data difference between third pixel data PD13 of the first horizontal line HL1 and first pixel data PD21 of the second horizontal line HL2 and may determine a data difference between sixth pixel data PD16 of the first horizontal line HL1 and fourth pixel data PD24 of the second horizontal line HL2. As described above, in determining a data difference, a data difference between pixels driven by the same driving unit (311 or 312 of FIG. 2) may be determined. Also, the controller may add data differences to determine a first comparison result SUM1.

Similarly, the controller may determine the respective data differences between pixel data PD22, PD25 and PD2*m*-1 of a second pixel group G of the second horizontal line HL2 and the pixel data PD13, PD16 and PD1*m* of the third pixel group B of the first horizontal line HL1. The controller may add the determined data differences to determine a second comparison result SUM2.

Moreover, the controller may determine the respective data differences between pixel data PD23, PD26 and PD2*m* of a third pixel group B of the second horizontal line HL2 and the pixel data PD13, PD16 and PD1*m* of the third pixel group B of the first horizontal line HL1. The controller may add the determined data differences to determine a third comparison result SUM3.

Moreover, the controller may determine a driving sequence of the pixel groups R, G and B based on the determined comparison results SUM1, SUM2 and SUM3. The controller may determine a driving sequence in which a pixel group of the second horizontal line HL2 is driven first for a comparison result that is relatively small between the pixel group and the third pixel group of the first horizontal line HL1. For example, if values increase in the order of the first comparison result SUM1, the second comparison result SUM2 and the third comparison result SUM3, a driving sequence may be determined in an order in which the first pixel group R is driven first, the second pixel group G is driven second, and the third pixel group B is driven third. That is, if the first comparison result SUM1 is less than the second comparison result SUM2, and the second comparison result is less than the third comparison result SUM3, a driving sequence may be determined in which the first pixel group R is driven first, the second pixel group G is driven second, and the third pixel group B is driven third.

Figure 10:
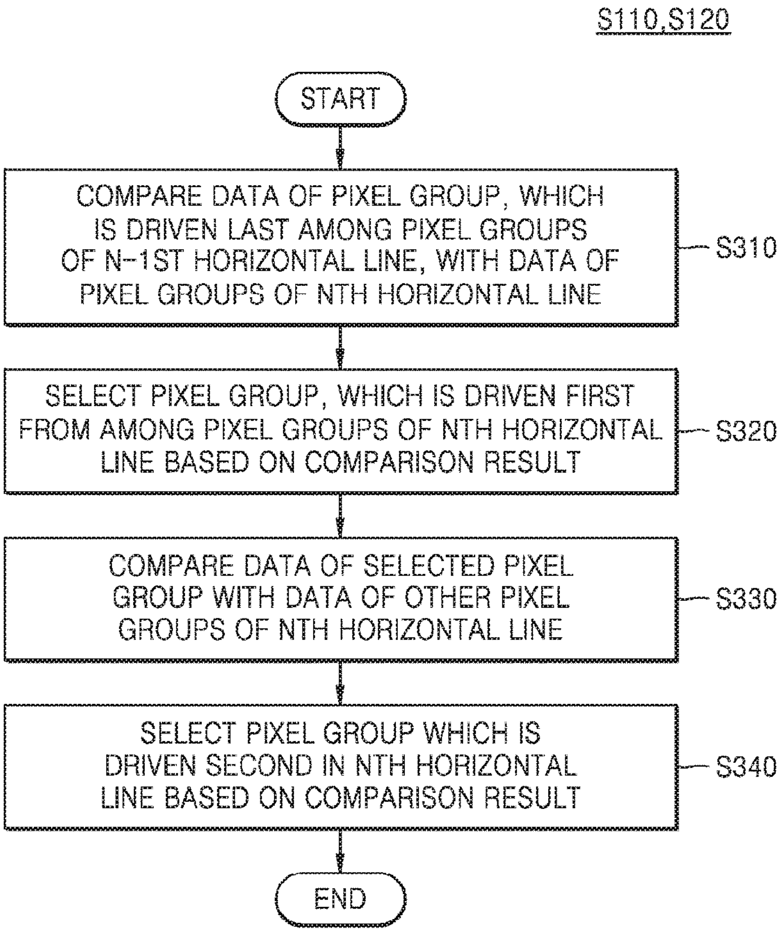
FIG. 10 is a flowchart illustrating in detail the image pattern analyzing operation and driving sequence determining operation of FIG. 7.

FIG. 10 is a flowchart illustrating in detail the image pattern analyzing operation and driving sequence determining operation of FIG. 7.

Referring to FIG. 10, in operation S310, the selection control logic 510 may compare data of a pixel group, which is has been driven last (i.e., the N−1st horizontal line) with data of pixel groups of a current horizontal line (i.e., the Nth horizontal line). Operation S310 is the same as operation S210 of FIG. 8, and thus, its detailed description is not repeated.

In operation S320, the selection control logic 510 may select a pixel group that will be driven first during the current (Nth) horizontal line based on a result of the comparison.

In operation S330, the selection control logic 510 may compare data of the pixel group that was selected in operation S320 with data of the other pixel groups of the current (Nth) horizontal line. For example, if a second pixel group is selected in operation S320, the selection control logic 510 may compare data of the second pixel group with the data of a first pixel group and the data of a third pixel group.

In operation S340, the selection control logic 510 may select a pixel group that will be driven second in the Nth horizontal line based on a result of the comparison in operation 330. For example, the second pixel group may be driven first, and the controller may select either the first pixel group or the third pixel group depending on the comparison value. If the comparison value for the comparison of the second pixel group and the first pixel group is less than the comparison value for the comparison of the second pixel group and the third pixel group, then the first pixel group is selected to be driven second and the third pixel group is selected to be drive third. If the comparison value for the comparison of the second pixel group and the first pixel group is greater than the comparison value for the comparison of the second pixel group and the third pixel group, then the third pixel group is selected to be driven second and the first pixel group is selected to be driven third.

By repeating operations S330 and S340, the controller may determine a driving sequence of pixel groups that are driven from second to last.

According to the present embodiment, a pixel group that is to be driven first among the pixel groups for the Nth horizontal line may be determined by comparing the data of the pixel groups with data of a pixel group that was driven last in an N−1st horizontal line, and then, a pixel group that is to be driven second or driven last may be determined by comparing data of the pixel groups of the Nth horizontal line.

Figure 11:
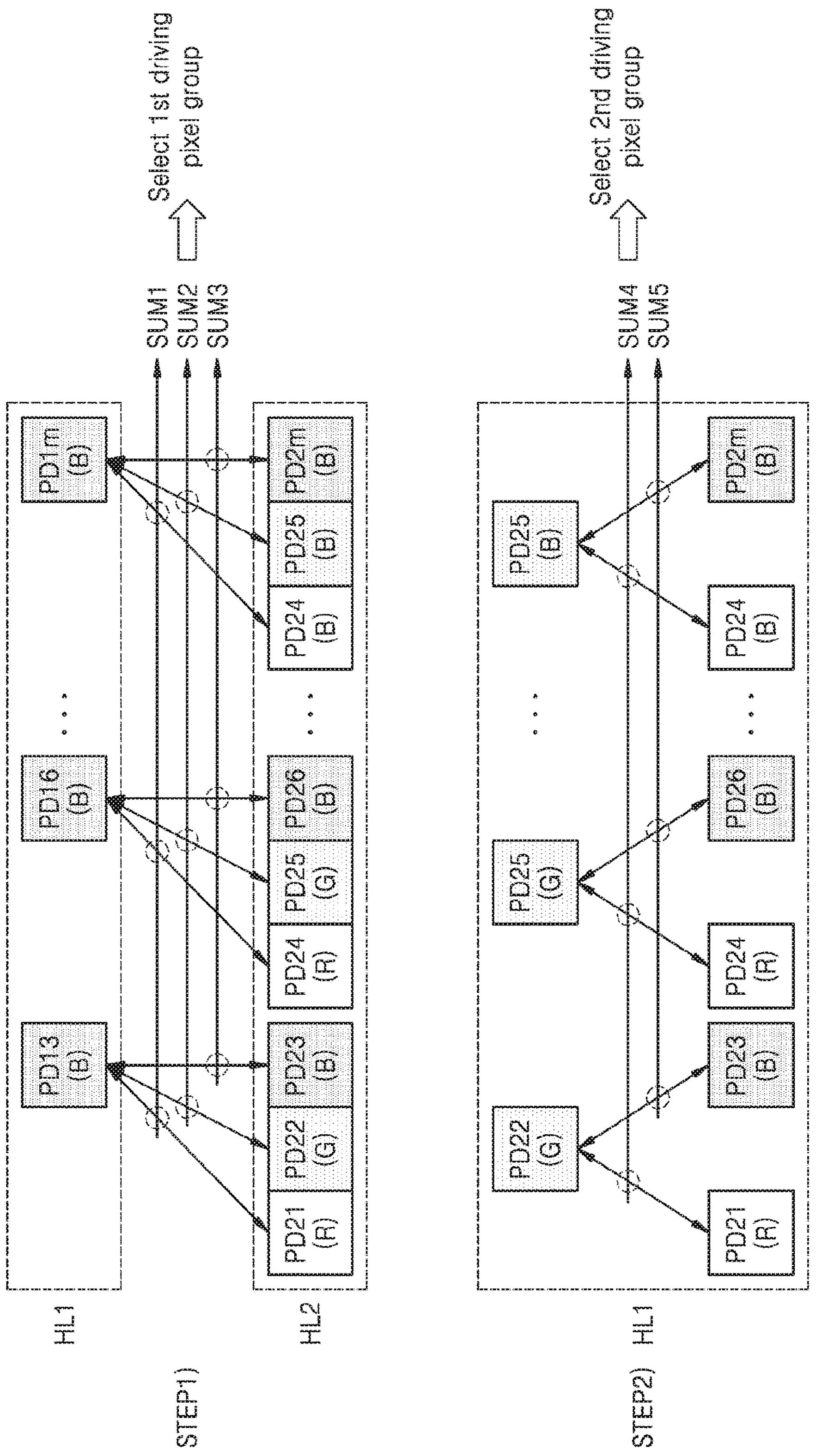
FIG. 11 illustrates in detail a pixel group driving sequence determining method of FIG. 10.

FIG. 11 illustrates in greater detail a pixel group driving sequence determining method of FIG. 10 and, in particular, depicts a method of determining a driving sequence of pixel groups of the second horizontal line HL2.

For this example, consider that the third pixel group B was driven last in the first (or previous) horizontal line HL1.

STEP1 may depict an operation of selecting a pixel group that is to be driven first in the second horizontal line HL2, and STEP2 may depict an operation of a pixel group that is to be driven next.

In STEP1, the controller may respectively compare pixel data of each of the first to third pixel groups R, G and B of the second horizontal line HL2 with the pixel data PD13, PD16 and PD1*m* of the third pixel group B of the first horizontal line HL1 to determine a comparison result. A method of determining the comparison result is the same as FIG. 9B, and thus, its detailed description is not repeated.

The controller may select a pixel group that is to be first driven from among the pixel groups R, G and B of the second horizontal line HL2 based on the determined comparison results SUM1, SUM2 and SUM3 as described in connection with FIG. 9B. For example, if values increase in the order of the second comparison result SUM2, the first comparison result SUM1, and the third comparison result SUM3, a driving sequence may be determined in order for the second pixel group G to be first driven.

In STEP2, the controller may compare pixel data of each of the first and third pixel groups R and B of the second horizontal line HL2 with pixel data of the second pixel group G of the second horizontal line HL2 to determine a comparison result. The controller may compare the pixel data of the first pixel group R with the pixel data of the second pixel group G to determine a fourth comparison result SUM4, and may compare the pixel data of the third pixel group B with the pixel data of the second pixel group G to determine a fifth comparison result SUM5.

The controller may select a pixel group that is to be driven first based on the determined comparison results SUM4 and SUM5. For example, if the fourth comparison result SUM4 is greater than the fifth comparison result SUM5, the third pixel group B may be selected as a pixel group that is driven after the second pixel group G. Therefore, the second pixel group G, the third pixel group B, and the first pixel group R may be sequentially driven in the second horizontal line. If the fourth comparison result SUM4 is less than the fifth comparison result SUM5, the first pixel group R may be selected as a pixel group that is driven after the second pixel group G. Therefore, the second pixel group G, the first pixel group R, and the third pixel group B may be sequentially driven in the second horizontal line. A driving sequence of pixel groups may be determined by applying the above-described method to the other horizontal lines.

Figure 12:
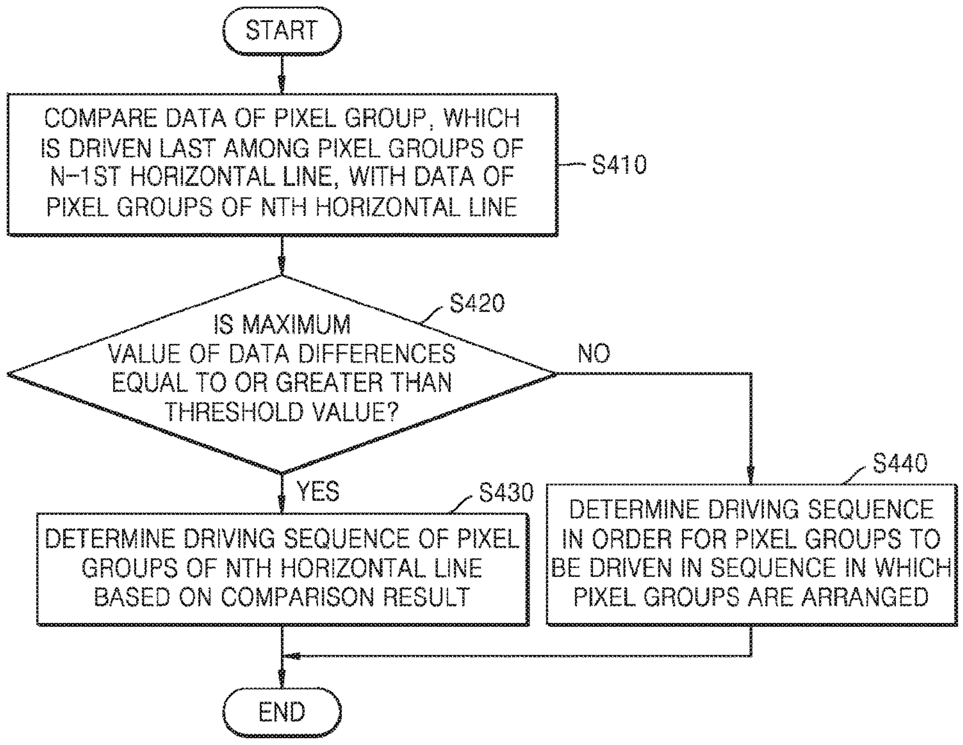
FIG. 12 is a flowchart illustrating in detail the image pattern analyzing operation and driving sequence determining operation of FIG. 7.

FIG. 12 is a flowchart illustrating in detail the image pattern analyzing operation and driving sequence determining operation of FIG. 7.

Referring to FIG. 12, in operation S410, the selection control logic 510 may compare data of a pixel group that is driven last in an N−1st horizontal line with data of pixel groups of an Nth horizontal line. Operation S410 is the same as operation S210 of FIG. 8, and thus, its detailed description is not repeated.

In operation S420, the selection control logic 510 may determine whether the largest value of determined data differences is equal to or greater than a threshold value based on a result of the comparison.

In operation S430, if the largest value of the data differences is equal to or greater than the threshold value, the selection control logic 520 may determine a driving sequence of the pixel groups of the Nth horizontal line based on the comparison result. For example, the selection control logic 510 may determine a driving sequence of pixel groups through operation S220 of FIG. 8 and operations S320 to S340 of FIG. 10.

In operation S440, if the largest value of the data differences is less than the threshold value, the selection control logic 520 may determine a driving sequence for the pixel groups to be driven in the sequence in which the pixel groups are arranged. For example, if a horizontal line includes first to third pixel groups that are sequentially arranged, the selection control logic 510 may determine a driving sequence for the first pixel group, the second pixel group, and the third pixel group to be sequentially driven. In another embodiment, if the largest value of the data differences is less than the threshold value, the selection control logic 520 may apply a predetermined driving sequence as a driving sequence for the pixel groups of the Nth horizontal line. In another embodiment, if the data differences that are determined in operation S410 to be the same, the selection control logic 520 may apply a predetermined driving sequence as the driving sequence of the pixel groups of the Nth horizontal line.

Figure 13:
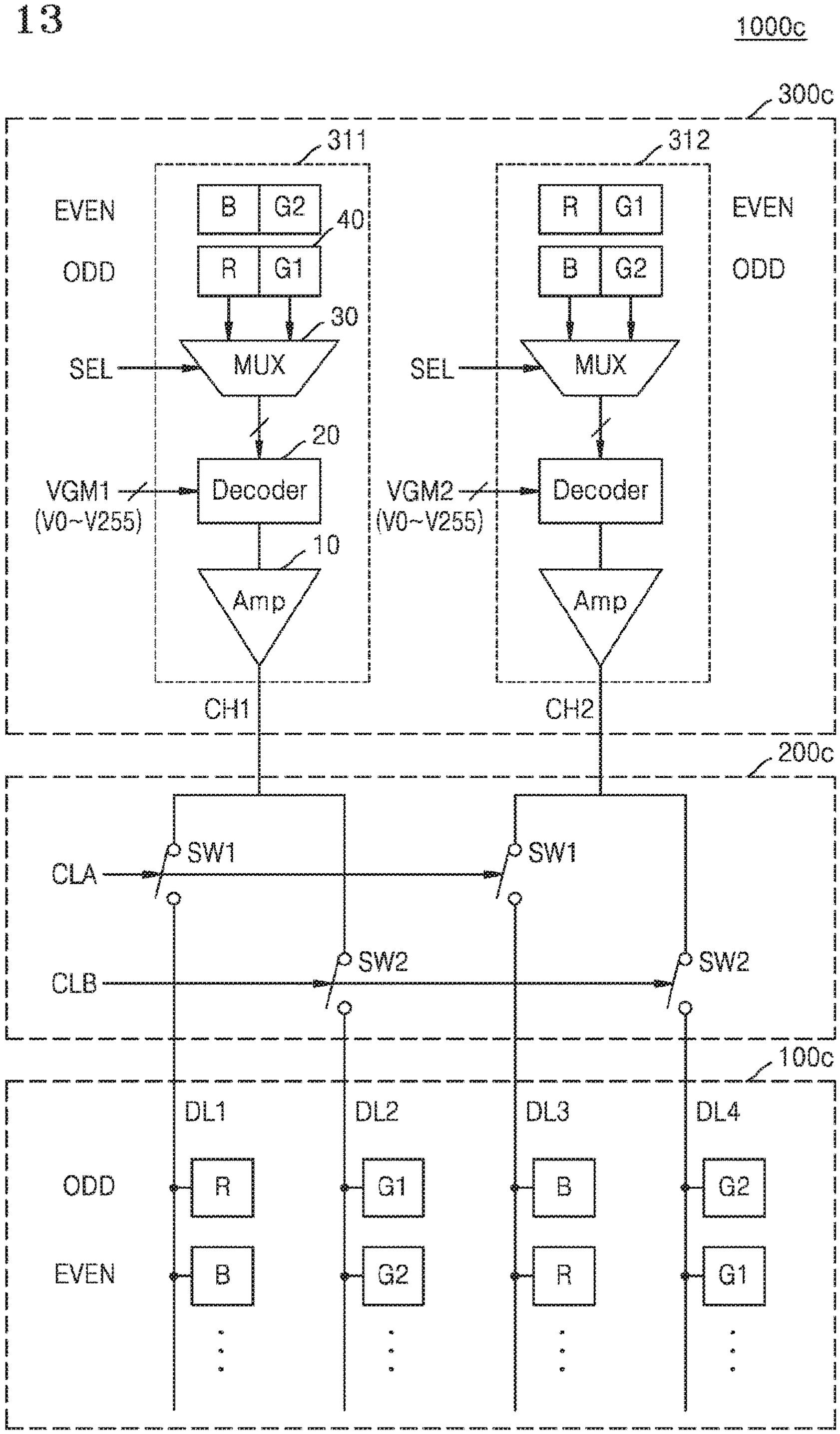
FIG. 13 is a circuit diagram illustrating an implementation example of a display apparatus according to an embodiment.

FIG. 13 is a circuit diagram illustrating an implementation example of a display apparatus 1000*c* according to an embodiment.

The display apparatus 1000*c* shows a case in which a display panel 100*c* has a pentile structure including R, G1, B, and G2 pixels. The display apparatus 1000*c* shows details of the display apparatus 1000*a* of FIG. 2, and the details described above with reference to FIG. 2 may be applied to the present embodiment. Descriptions of the same functional blocks or elements are not repeated.

Referring to FIG. 13, a plurality of driving units 311 and 312 may each include a channel amplifier 10, a decoder 20, a multiplexer 30 and a latch 40. The latch 40 may store pieces of pixel data corresponding to pixels driven by a driving unit in units of one line. As illustrated, a first driving unit 311 may drive first and second pixels connected to first and second data lines DL1 and DL2, and thus, if an odd line of the display panel 100*c* is driven, the latch 40 of the first driving unit 311 may store R data and G1 data. The R data and the G1 data may be applied to a multiplexer 30 selected according to a data selection signal SEL and output to the decoder 20. In this case, the data selection signal SEL may be changed in units of one horizontal line according to a pixel driving sequence. A level of the data selection signal SEL may be changed in synchronization with one of first and second selection signals CLA and CLB.

In driving an odd line of the display panel 100*c*, if a first switch SW1 of the data switching unit 200*c* is turned on, or closed, in response to the first selection signal CLA, the multiplexer 30 of the first driving unit 311 may output R data to the decoder 20 in response to the data selection signal SEL, and the channel amplifier 10 may output a gamma voltage corresponding to the R data. Also, the multiplexer 30 of the second driving unit 312 may output B data to the decoder 20, and the channel amplifier 10 may output a gamma voltage corresponding to the B data.

If a second switch SW2 of the data switching unit 200*c* is turned on, or closed, in response to the second selection signal CLB, the multiplexer 30 of the first driving unit 311 may output G1 data to the decoder 20 in response to the data selection signal SEL, and the channel amplifier 10 may output a gamma voltage corresponding to the G1 data. Also, the multiplexer 30 of the second driving unit 312 may output G2 data to the decoder 20, and the channel amplifier 10 may output a gamma voltage corresponding to the G2 data.

In driving an even line of the display panel 100*c*, if a first switch SW1 of the data switching unit 200*c* is turned on in response to the first selection signal CLA, the multiplexer 30 of the first driving unit 311 may output B data to the decoder 20 in response to the data selection signal SEL, and the channel amplifier 10 may output a gamma voltage corresponding to the B data. Also, the multiplexer 30 of the second driving unit 312 may output R data to the decoder 20, and the channel amplifier 10 may output a gamma voltage corresponding to the R data.

If a second switch SW2 of the data switching unit 200*c* is turned on in response to the second selection signal CLB, the multiplexer 30 of the first driving unit 311 may output G2 data to the decoder 20 in response to the data selection signal SEL, and the channel amplifier 10 may output a gamma voltage corresponding to the G2 data. Also, the multiplexer 30 of the second driving unit 312 may output G1 data to the decoder 20, and the channel amplifier 10 may output a gamma voltage corresponding to the G1 data.

As described above, a pixel driving sequence may be set for each horizontal line, and thus, a sequence in which the first selection signal CLA and the second selection signal CLB are generated may be changed. For example, in a case in which the display panel 100*c* displays a green image, a first grayscale voltage may be applied to pixels connected to odd-numbered data lines DL1 and DL3, and a 255th grayscale voltage may be applied to pixels connected to even-numbered data lines DL2 and DL4. In order to minimize or reduce the number of times an output signal of each of the driving units 311 and 312 swings widely, odd-numbered pixels (for example, a first pixel group) may be first selected and driven in driving an odd line, and in driving an even line, even-numbered pixels (for example, a second pixel group) may be selected first and driven.

Figure 14:
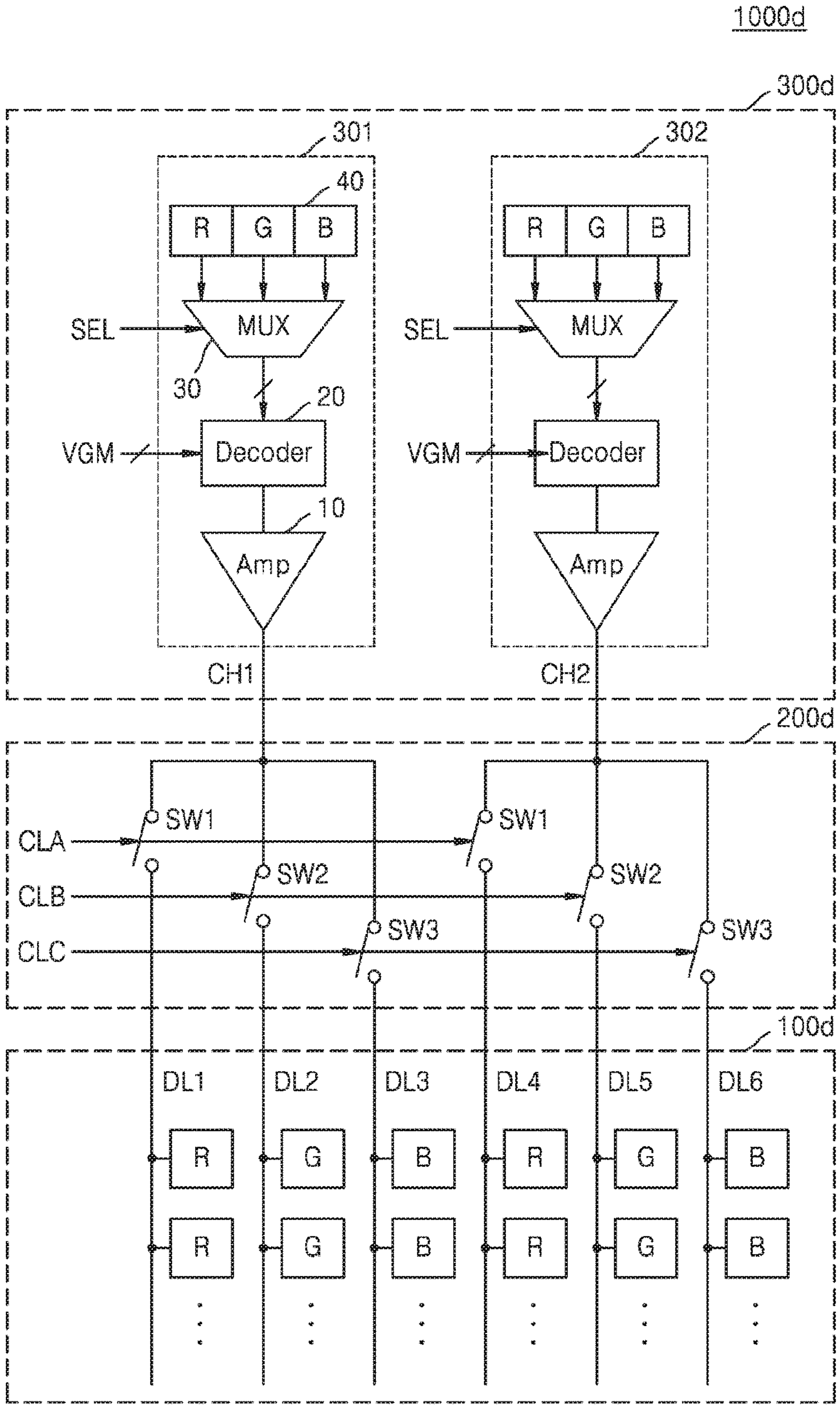
FIG. 14 is a circuit diagram illustrating an implementation example of a display apparatus according to an embodiment.

FIG. 14 is a circuit diagram illustrating an implementation example of a display apparatus 1000*d* according to an embodiment.

The display apparatus 1000*d* shows a case in which a display panel 100*d* has a stripe structure in which R, G, and B pixels are arranged in a repeated pattern. The display apparatus 1000*d* shows in detail the display apparatus 1000*b* of FIG. 4, and the details described above with reference to FIG. 4 may be applied to the present embodiment. Descriptions of the same functional blocks or elements are not repeated.

Referring to FIG. 14, a plurality of driving units 311 and 312 may each include a channel amplifier 10, a decoder 20, a multiplexer 30 and a latch 40. The latch 40 may store pieces of pixel data corresponding to pixels driven by a driving unit in units of one horizontal line. As illustrated, a first driving unit 311 may drive first to third pixels connected to first to third data lines DL1 to DL3, and a second driving unit 312 may drive fourth to sixth pixels connected to fourth to sixth data lines DL4 to DL6. If a first switch SW1 is turned on in response to a first selection signal CLA, the first and second driving units 311 and 312 may drive the first and fourth pixels (for example, red pixels). If a second switch SW2 is turned on in response to a second selection signal CLB, the first and second driving units 311 and 312 may drive the second and fifth pixels (for example, green pixels). If a third switch SW3 is turned on in response to a third selection signal CLB, the first and second driving units 311 and 312 may drive the third and sixth pixels (for example, blue pixels). Red, green, and blue pixels may be sequentially driven during one horizontal period in a time-division manner.

The first and second driving units 311 and 312 may each include a channel amplifier 10, a decoder 20, a multiplexer 30 and a latch 40. The multiplexer 30 may select one signal from among three input signals and may output the selected signal to the decoder 20 in response to the data selection signal SEL. R data, G data, and B data may be applied to the multiplexer 30 and may be selectively output to the decoder 20 according to the data selection signal SEL that is determined based on a pixel driving sequence.

For example, if a pixel driving sequence is determined as the sequence of a green pixel, a red pixel, and a blue pixel in a first horizontal period and a pixel driving sequence is determined as the sequence of a red pixel, a blue pixel, and a green pixel in a second horizontal period, for the first horizontal period, a selection signal may be generated in the sequence of the second selection signal CLB, the first selection signal CLA, and the third selection signal CLC, and in the second horizontal period, a selection signal may be generated in the sequence of the first selection signal CLA, the third selection signal CLC, and the second selection signal CLB.

In the first horizontal period, if a second switch SW2 of the data switching unit 200*d* is turned on in response to the second selection signal CLB, the multiplexer 30 of each of the first and second driving units 311 and 312 may output G data to the decoder 20 in response to the data selection signal SEL, and the channel amplifier 10 may output a gamma voltage corresponding to the G data. Subsequently, if a first switch SW1 of the data switching unit 200*d* is turned on in response to the first selection signal CLA, the multiplexer 30 of each of the first and second driving units 311 and 312 may output R data to the decoder 20 in response to the data selection signal SEL, and the channel amplifier 10 may output a gamma voltage corresponding to the R data. Finally, if the first switch SW3 of the data switching unit 200*d* is turned on in response to the first selection signal CLC, the multiplexer 30 of each of the first and second driving units 311 and 312 may output B data to the decoder 20 in response to the data selection signal SEL, and the channel amplifier 10 may output a gamma voltage corresponding to the B data.

In the second horizontal period, if the first switch SW1 of the data switching unit 200*d* is turned on in response to the first selection signal CLA, the multiplexer 30 of each of the first and second driving units 311 and 312 may output R data to the decoder 20 in response to the data selection signal SEL, and the channel amplifier 10 may output a gamma voltage corresponding to the R data. Subsequently, if the first switch SW3 of the data switching unit 200*d* is turned on in response to the first selection signal CLC, the multiplexer 30 of each of the first and second driving units 311 and 312 may output B data to the decoder 20 in response to the data selection signal SEL, and the channel amplifier 10 may output a gamma voltage corresponding to the B data. Finally, if the second switch SW2 of the data switching unit 200*d* is turned on in response to the second selection signal CLB, the multiplexer 30 of each of the first and second driving units 311 and 312 may output G data to the decoder 20 in response to the data selection signal SEL, and the channel amplifier 10 may output the gamma voltage corresponding to the G data.

Figure 15:
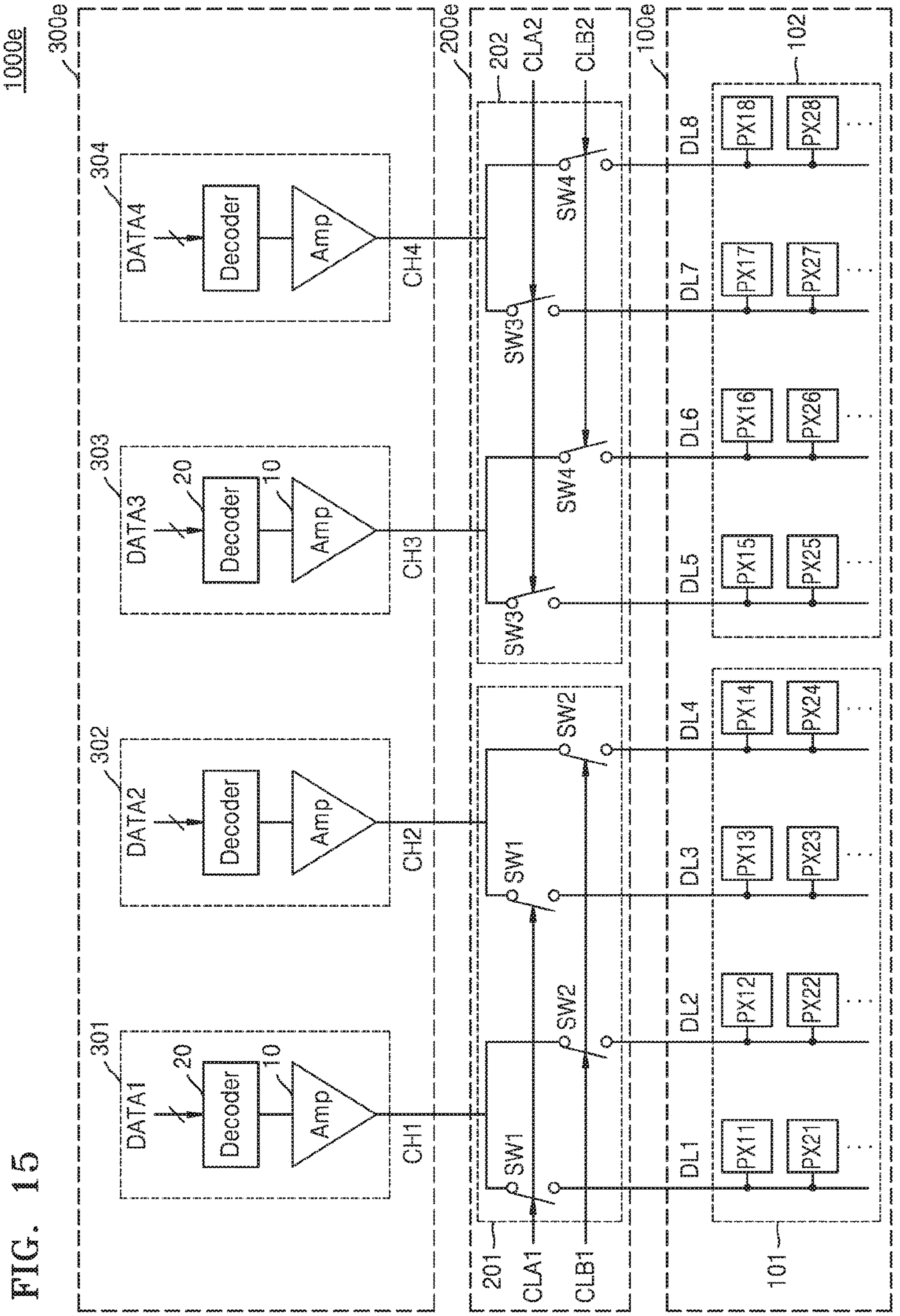
FIG. 15 is a circuit diagram illustrating an implementation example of a display apparatus according to an embodiment.

FIG. 15 is a circuit diagram illustrating an implementation example of a display apparatus 1000*e* according to an embodiment. The display apparatus 1000*e* of FIG. 15 is a modified example of the display apparatus 1000*a* of FIG. 2, and the details described above with reference to FIG. 2 may be applied to the present embodiment. Descriptions of the same functional blocks or elements are not repeated.

Referring to FIG. 15, a display panel 100*e* may include a first region 101 and a second region 102. Data lines DL1 to DL4 in the first region 101 may be connected to first and second channels CH1 and CH2 through a first switching unit 201. Data lines DL5 to DL8 in the second region 102 may be connected to third and fourth channels CH3 and CH4 through a second switching unit 202. The first switching unit 201 may include a plurality of first switches SW1 that are turned on in response to a first selection signal CLA1, and a plurality of second switches SW2 that are turned on in response to a second selection signal CLB1. The second switching unit 202 may include a plurality of third switches SW3 that are turned on in response to a third selection signal CLA2, and a plurality of fourth switches SW4 that are turned on in response to a fourth selection signal CLB2. The first selection signal CLA1 may be generated at the same time or substantially the same time as the third selection signal CLA2 or the fourth selection signal CLB2, and the second selection signal CLA2 may be generated at the same time or substantially the same time as the other of the third selection signal CLA2 and the fourth selection signal CLB2. In this case, a sequence in which the selection signals are generated may be changed in units of one horizontal line.

As described above, a controller (500 of FIG. 1) may determine a driving sequence of pixels in units for one horizontal line based on an image pattern. In this case, in the present embodiment, the controller may determine a driving sequence of pixels in the first region 101 based on an image pattern of the first region 101 and may determine a driving sequence of pixels in the second region 102 based on an image pattern of the second region 102.

For example, the controller 500 may determine a driving sequence of pixels so that pixels PX11 and PX13 of an odd column are driven first in a first horizontal period and pixels PX22 and PX24 of an even column are driven first in a second horizontal period based on the image pattern of the first region 101. The controller 500 may determine a driving sequence of pixels so that pixels PX16 and PX18 of the even column are driven first in the first horizontal period and pixels PX26 and PX28 of the even column are driven first in the second horizontal period based on the image pattern of the second region 102. Therefore, in the first horizontal period, the controller 500 may first generate the first selection signal CLA1 and the fourth selection signal CLB2, and then may generate the second selection signal CLB1 and the third selection signal CLA2. Also, in the second horizontal period, the controller 500 may first generate the second selection signal CLB1 and the third selection signal CLA1, and then may generate the first selection signal CLA1 and the fourth selection signal CLB2. As described above, the controller 500 may separately control a driving sequence of pixels in the first region 101 of the display panel 100 and a driving sequence of pixels in the second region 102.

In the present embodiment, the display panel 100*e* is depicted as including two regions, but the present disclosure is not limited thereto. In other embodiments, the display panel 100*e* may include a plurality of regions greater than two, and the controller may determine a driving sequence of pixels in each of the regions based on an image pattern of each of the regions.

Figure 16:
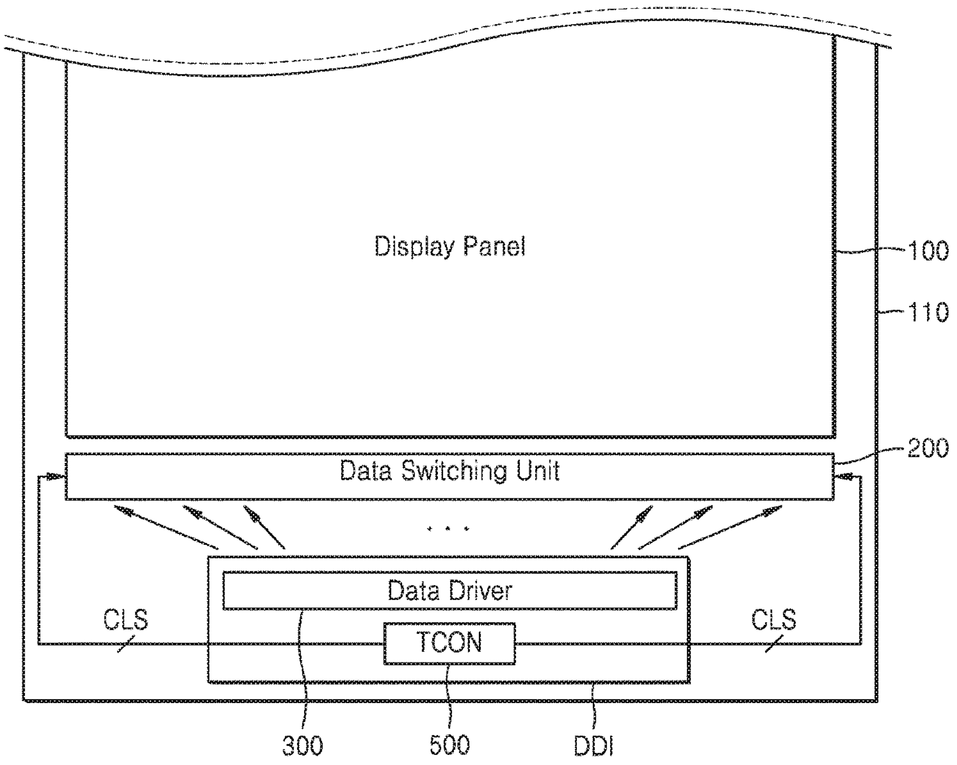
FIG. 16 is a circuit diagram illustrating an implementation example of a display module including a display apparatus according to an embodiment.

FIG. 16 is a circuit diagram illustrating an implementation example of a display module including a display apparatus according to an embodiment.

Referring to FIG. 16, in the display module according to an embodiment, a display driving circuit (for example, a controller 500, a data driver 300, a gate driver (not shown in FIG. 16), and a data switching unit 200) may be implemented as a single semiconductor chip (IC) or a plurality of semiconductor chips (ICs). In an embodiment, the data driver 300 and the controller 500 may be implemented as a single semiconductor chip (IC), and the data switching unit 200 and the gate driver may be implemented on a display panel 100. In another embodiment, the controller 500, the data driver 300, and the gate driver (not shown) may be implemented as a single semiconductor chip, and the data switching unit 200 may be implemented on the display panel 100.

A semiconductor chip (a display driver IC) DDI into which the display driving circuit is integrated may be mounted on a lower substrate 110, on which the display panel 100 is disposed, in a chip-on glass (COG) type. Signals output from the semiconductor chip DDI may be supplied to the display panel 100 or the data switching unit 200 through a wiring that is patterned on the lower substrate 110. Selection signals CLS output from the controller 500 of the semiconductor chip DDI may be supplied to the data switching unit 200. The data switching unit 200 may sequentially supply signals in a time-division manner, supplied from the data driver 300, to data lines of the display panel 100 according to the selection signals CLS. As described above with reference to FIGS. 1 to 15, the controller 500 may determine a driving sequence of pixel groups of each of horizontal lines based on a pattern of an image displayed by the display panel 100, and the selection signals CLS may be generated based on the driving sequence.

The display module according to the present embodiment may be equipped in medium-sized or small electronic devices, such as, but not limited to, smartphones, tablet personal computers (PCs), smart watches, etc.

Figure 17:
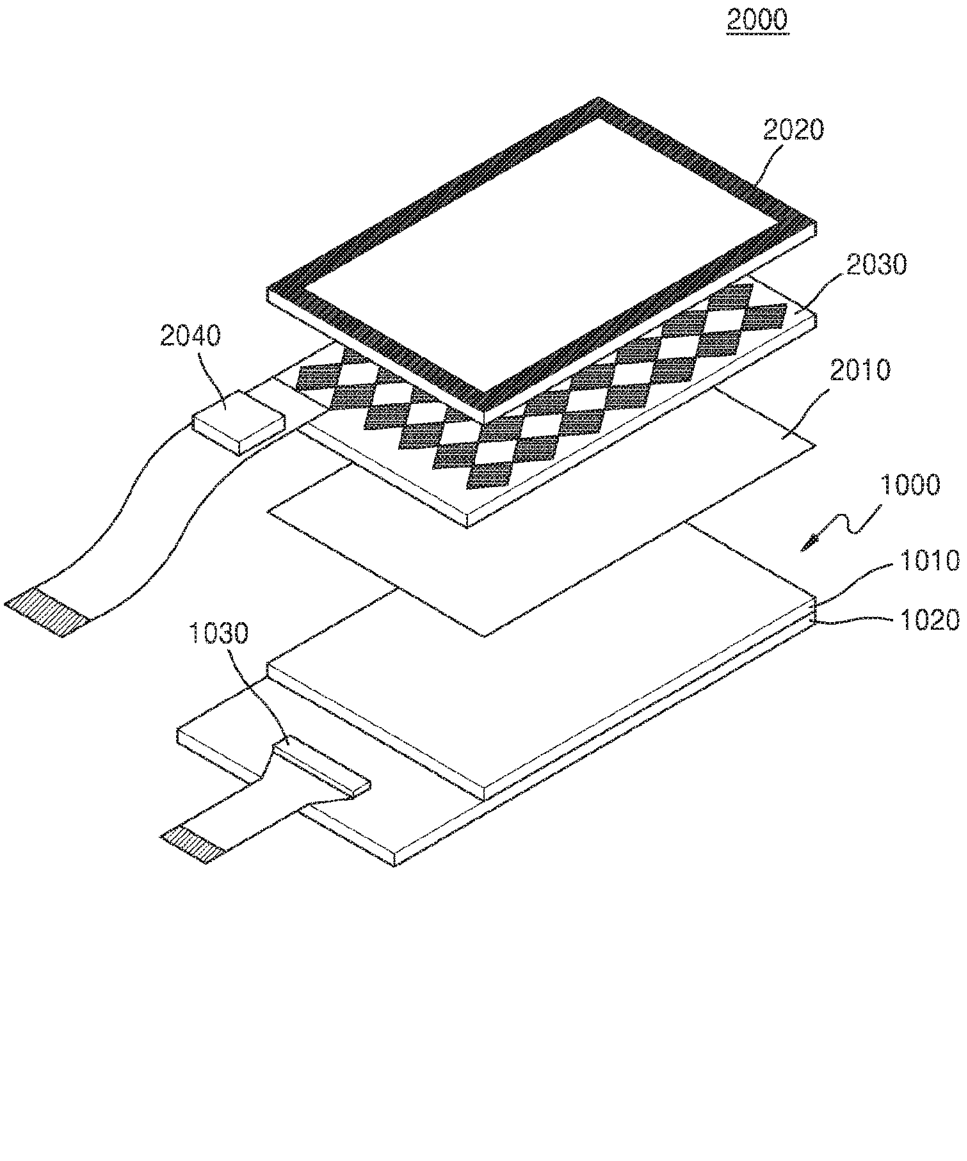
FIG. 17 illustrates a touch screen module according to an embodiment.

FIG. 17 illustrates a touch screen module 2000 according to an embodiment.

Referring to FIG. 17, the touchscreen module 2000 may include a display apparatus 1000, a polarizer 2010, a touch panel 2030, a touch controller 2040 and a window glass 2020. The display apparatus 1000 may include a display panel 1010, a printed board 1020 and a display driving circuit 1030. The display apparatus 1000 may be the display apparatus 1000 according to the embodiments described above with reference to FIGS. 1 to 17.

The window glass 2020 may be formed of a material, such as acryl, tempered glass, and/or the like, and protects the touchscreen module 200 against an external impact, a scratch caused by a repetitive touch, and/or the like. The polarizer 2010 may be provided for enhancing an optical characteristic of the display panel 1010. The display panel 1010 may be manufactured by patterning a transparent electrode on the printed board 1020. The display panel 1010 may include a plurality of pixels for displaying a frame. According to an embodiment, the display panel 1010 may be a liquid crystal panel; however, the present embodiment is not limited thereto. In other embodiments, the display panel 1010 may include various kinds of display devices. For example, the display panel 1010 may be an organic light-emitting diode (OLED), an electrochromic display (ECD), a digital mirror device (DMD), an actuated mirror device (AMD), a grating light valve (GLV), a plasma display panel (PDP), an electro luminescent display (ELD), a light emitting diode (LED) display, or a vacuum fluorescent display (VFD), etc.

The display driving circuit 1030 may include a data driver (300 of FIG. 1) and a controller (500 of FIG. 1). The display driving circuit 1030 may further include a gate driver (400 of FIG. 1). In the present embodiment, the display driving circuit 1030 is illustrated as including one chip, but this is merely for convenience of description. In other embodiments, the display driving circuit 1030 may be equipped with a plurality of chips. Also, the display driving circuit 1030 may be mounted on a printed board including a glass material in the COG type; however, this is merely one embodiment of many possible embodiments. In other embodiments, the display driving circuit 1030 may be mounted in various types, such as a chip-on film (COF) type, a chip-on board (COB) type, etc.

The touchscreen module 2000 may further include the touch panel 2030 and the touch controller 2040. The touch panel 2030 may be formed by patterning a transparent electrode, such as indium tin oxide (ITO) or the like, on a glass substrate or a polyethylene terephthlate (PET) film. In an embodiment, the touch panel 2030 may be disposed on the display panel 1010. For example, pixels of the touch panel 2030 may be merged with pixels of the display panel 1010. The touch controller 2040 may sense a touch applied to the touch panel 2030 to determine touch coordinates and may transfer the touch coordinates to a host (not shown). The touch controller 2040 and the display driving circuit 1030 may be integrated into one semiconductor chip.

Figure 18:
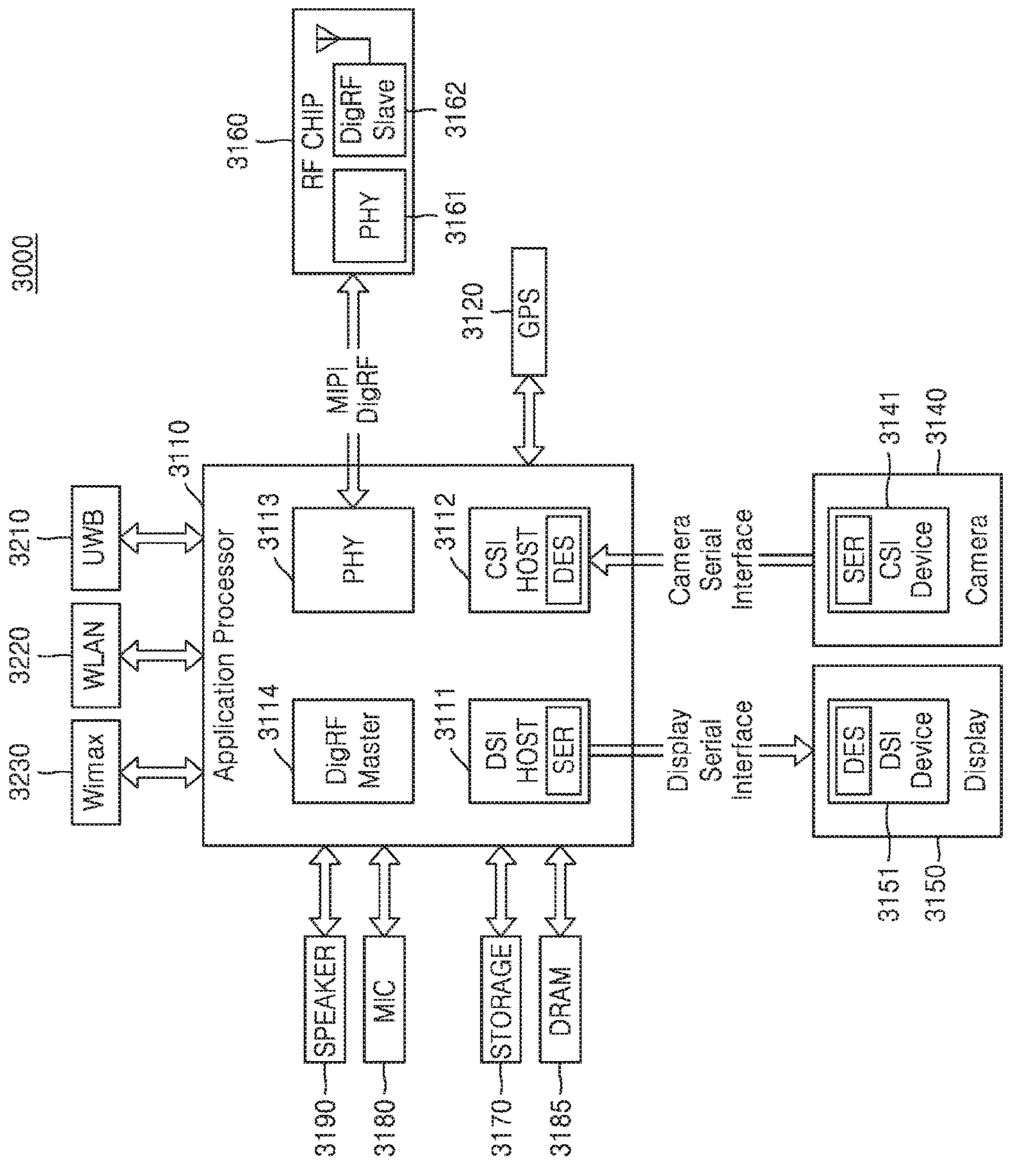
FIG. 18 is a block diagram of an electronic system including a display apparatus according to an embodiment.

FIG. 18 is a block diagram of an electronic system 3000 including a display apparatus according to an embodiment.

Referring to FIG. 18, the electronic system 3000 may be implemented as a data processing device (for example, a mobile terminal, a personal digital assistant (PDA), a portable multimedia player (PMP), a smartphone, or the like) that is capable of using or supporting an MIPI interface.

The electronic system 3000 may include an application processor 3110, an image sensor 3140, and a display apparatus 3150. The display apparatus 3150 may be the above-described display apparatus 1000 according to the embodiments.

A camera serial interface (CSI) host 3112 equipped in the application processor 3110 may perform serial communication with a CSI device 3141 of the image sensor 3140 through a CSI. In this case, for example, a light deserializer may be equipped in the CSI host 3112, and a light serializer may be equipped in the CSI device 3141.

A display serial interface (DSI) host 3111 equipped in the application processor 3110 may perform serial communication with a DSI device 3151 of the display apparatus 3150 through a DSI. In this case, for example, a light serializer may be equipped in the DSI host 3111, and a light deserializer may be equipped in the DSI device 3151.

The electronic system 3000 may further include a radio frequency (RF) chip 3160 capable of communicating with the application processor 3110. A physical layer (PHY) 3113 of the electronic system 3000 and a PHY 3161 of the RF chip 3160 may exchange data according to MIPI DigRF.

The electronic system 3000 may further include a global positioning system (GPS) 3120, a storage 3170, a microphone 3180, a DRAM 3185 and a speaker 3190. The electronic system 3000 may perform communication by using Wimax 3230, wireless local area network (WLAN) 3220 and/or ultra-wideband (UWB) 3210.

Figure 19:
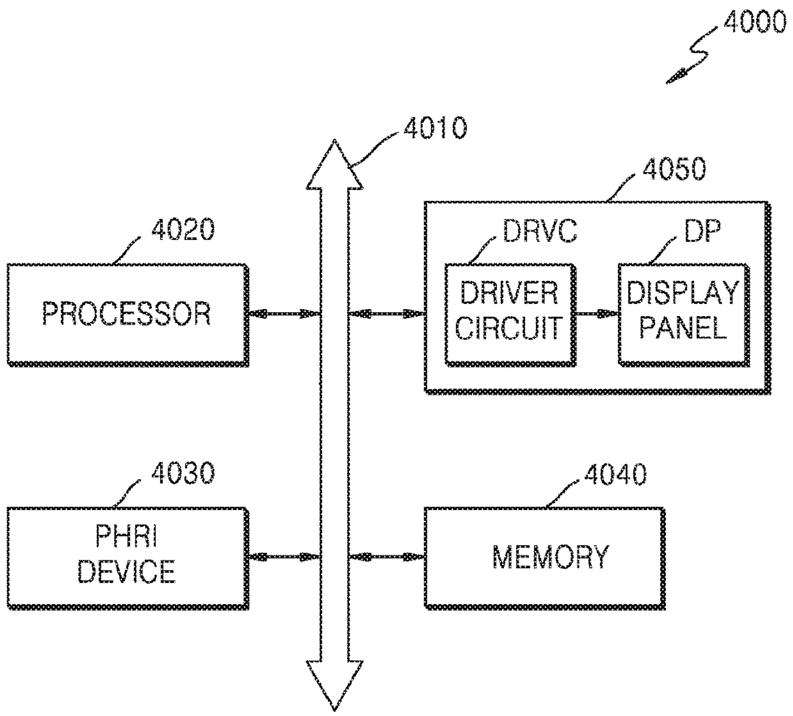
FIG. 19 is a diagram illustrating a display system according to an embodiment.

FIG. 19 is a diagram illustrating a display system 4000 according to an embodiment.

Referring to FIG. 19, the display system 4000 may include a processor 4020 electrically connected to a system bus 4010, a display apparatus 4050, a peripheral device 4030 and a memory 4040.

The processor 4020 may control an input/output of data to/from the peripheral device 4030, the memory 4040 and the display apparatus 4050. The processor 4020 may perform image processing on image data transferred between the devices. The display apparatus 4050 may include a display panel DP and a display driving circuit DRVC. The display apparatus 4050 may store image data, applied through the system bus 4010, in a frame memory or a line memory included in the display driving circuit DRVC, and then may display the an image corresponding to the stored image data in the display panel DP. The display apparatus 4050 may be the display apparatus 1000 according to the embodiments, and the display driving circuit DRVC may include a data driver (300 of FIG. 1) and a controller (500 of FIG. 1). The display driving circuit DRVC may further include a gate driver (400 of FIG. 1).

The peripheral device 4030 may be a device that converts a moving image or a still image, captured by a camera, a scanner, a webcam and/or the like, into an electrical signal. Image data obtained through the peripheral device 4030 may be stored in the memory device 4040, or may be displayed by a panel of the display apparatus 4050 in real time. The memory 4040 may include a volatile memory, such as a DRAM or the like, and/or a nonvolatile memory, such as flash memory or the like. The memory 4040 may be configured with a DRAM, a PRAM, a MRAM, a ReRAM, a FRAM, a NOR flash memory, a NAND flash memory, a fusion flash memory (for example, a memory in which an SRAM buffer is combined with a NOR flash memory and a NAND flash memory) and/or the like. The memory 4040 may store image data obtained from the peripheral device 4030 or may store an image signal obtained through image processing by the processor 4020.

The display system 4000 according to the present embodiment may be applied to electronic devices, such as tablet PCs, televisions (TVs), etc., but is not limited thereto. In other embodiments, the display system 4000 may be applied to various kinds of electronic devices displaying an image.

While the inventive concept has been particularly shown and described with reference to embodiments thereof, it will be understood that various changes in form and details may be made therein without departing from the spirit and scope of the following claims.

What is claimed is:

1. A display driving circuit, comprising:

a data driver to sequentially drive a plurality of pixel groups in a time-division manner during one horizontal period, the plurality of pixel groups being included in each horizontal line of a display panel; and a controller to analyze a pattern of received image data to be displayed on the display panel and to determine a driving sequence of the plurality of pixel groups of each horizontal line based on a result of the analysis, wherein the controller is to further compare data of a pixel group driven last among pixel groups of an N-1 st horizontal line with data of pixel groups of an Nth horizontal line to determine data differences, and to select a pixel group having a smallest data difference of the data differences among pixel groups of the Nth horizontal line as a first group that is driven first during an Nth horizontal period.

2. The display driving circuit of claim 1, further comprising: a data switching unit to sequentially supply outputs of the data driver to a plurality of data lines based on the driving sequence, each data line corresponding to a pixel group of the plurality of pixel groups.

3. The display driving circuit of claim 2, wherein the data switching unit comprises:

a first switch to connect an output of the data driver to a first plurality of data lines connected to a first pixel group in response to a first selection signal, the first plurality of data lines being part of the plurality of data lines; and a second switch to connect an output of the data driver to a second plurality of data lines connected to a second pixel group in response to a second selection signal, the second plurality of data lines being part of the plurality of data lines, and wherein the controller determines a sequence in which the first selection signal and the second selection signal are generated based on the driving sequence.

4. The display driving circuit of claim 3, wherein the data switching unit comprises a third switch to connect an output of the data driver to a third plurality of data lines connected to a third pixel group in response to a third selection signal, the third plurality of data lines being part of the plurality of data lines, and wherein the controller determines a sequence in which the first selection signal, the second selection signal, and the third selection signal are generated based on the driving sequence.

5. The display driving circuit of claim 2, wherein the display panel comprises a first region and a second region that are disposed in parallel in a horizontal direction, wherein the data switching unit comprises:

a first switching unit connected to a plurality of pixels in the first region to operate in response to a first selection signal and a second selection signal; and a second switching unit connected to a plurality of pixels in the second region to operate in response to a third selection signal and a fourth selection signal, and wherein the controller generates the first selection signal and the second selection signal based on a driving sequence of a plurality of pixel groups in the first region and generates the third selection signal and the fourth selection signal based on a driving sequence of a plurality of pixel groups in the second region.

6. The display driving circuit of claim 5, wherein the controller is to further analyse a pattern of image data corresponding to the first region of the display panel to determine the driving sequence of the plurality of pixel groups in the first region and to analyze a pattern of image data corresponding to the second region to determine the driving sequence of the plurality of pixel groups in the second region.

7. The display driving circuit of claim 1, wherein the controller is to further compare data of a pixel group driven last among pixel groups of an N 1st horizontal line with data of pixel groups of an Nth horizontal line and to determine a driving sequence of the pixel groups of the Nth horizontal line based on a result of the comparison.

8. The display driving circuit of claim 1, wherein the controller is to further compare data of the pixel group selected as the first group with data of each other pixel group of the Nth horizontal line to determine data differences, and to select a pixel group having a smallest data difference of the data differences as a second group that is driven second during the Nth horizontal period.

9. The display driving circuit of claim 1, wherein when a largest value of the data differences is less than a threshold value, the controller determines a driving sequence of the pixel groups of the Nth horizontal line based on a predetermined pixel driving sequence.

10. A display driving circuit, comprising:

a data driver to sequentially drive a plurality of pixel groups in a first region and a second region of a display panel during one horizontal period, the first region and the second region of the display panel being disposed in parallel in a horizontal direction and the plurality of pixel groups being included in each horizontal line of the display panel;

a data switching unit to sequentially supply outputs of the data driver to a plurality of data lines based on the driving sequence, each data line corresponding to a pixel group of the plurality of pixel groups, the data switching unit comprises:

a first switching unit connected to a plurality of pixels in the first region to operate in response to a first selection signal and a second selection signal; and a second switching unit connected to a plurality of pixels in the second region to operate in response to a third selection signal and a fourth selection signal; and a controller to analyze a pattern of received image data to be displayed on the display panel and to determine a driving sequence of the plurality of pixel groups of each horizontal line based on a result of the analysis, the controller generates the first selection signal and the second selection signal based on a driving sequence of a plurality of pixel groups in the first region and generates the third selection signal and the fourth selection signal based on a driving sequence of a plurality of pixel groups in the second region.

11. The display driving circuit of claim 10, wherein the controller is to further analyse a pattern of image data corresponding to the first region of the display panel to determine the driving sequence of the plurality of pixel groups in the first region and to analyze a pattern of image data corresponding to the second region to determine the driving sequence of the plurality of pixel groups in the second region.

* * * * *